(12) United States Patent
Siters et al.

(10) Patent No.: US 11,766,662 B2
(45) Date of Patent: Sep. 26, 2023

(54) HOMOGENEOUS CATALYTIC FIBER COATINGS AND METHODS OF PREPARING SAME

(71) Applicant: UNIFRAX I LLC, Tonawanda, NY (US)

(72) Inventors: Kevin E. Siters, Cheektowaga, NY (US); Michael Robert Carson, Jr., Tonawanda, NY (US); Maurice Belisle, Buffalo, NY (US); Jonathan Cross, Clarence Center, NY (US); Dillan R. Sayers, North Tonawanda, NY (US); Adam Kelsall, Williamsville, NY (US); Mark Travers, Ransomville, NY (US)

(73) Assignee: UNIFRAX I LLC, Tonawanda, NY (US)

(*) Notice: Subject to any disclaimer, the term of this patent is extended or adjusted under 35 U.S.C. 154(b) by 17 days.

(21) Appl. No.: 17/480,603

(22) Filed: Sep. 21, 2021

(65) Prior Publication Data
US 2022/0088577 A1  Mar. 24, 2022

Related U.S. Application Data

(60) Provisional application No. 63/107,240, filed on Oct. 29, 2020, provisional application No. 63/081,110, filed on Sep. 21, 2020.

(51) Int. Cl.
*B01J 21/04* (2006.01)
*B01J 23/10* (2006.01)
(Continued)

(52) U.S. Cl.
CPC ............. *B01J 23/63* (2013.01); *B01J 21/04* (2013.01); *B01J 23/464* (2013.01);
(Continued)

(58) Field of Classification Search
CPC ... B01J 21/04; B01J 23/10; B01J 23/44; B01J 23/464; B01J 23/63; B01J 35/0006;
(Continued)

(56) References Cited

U.S. PATENT DOCUMENTS 2,215,039 A   9/1940  Hood et al.
2,221,709 A  11/1940  Hood et al.
(Continued)

FOREIGN PATENT DOCUMENTS

EP   0318203 A2   5/1989
EP   1714697 A1  10/2006
(Continued)

OTHER PUBLICATIONS

International Search Report and Written Opinion received in International Application No. PCT/US19/25562, dated Jun. 17, 2019, 14 pages.
(Continued)

*Primary Examiner* — Cam N. Nguyen
(74) *Attorney, Agent, or Firm* — HAYNES AND BOONE, LLP

(57) ABSTRACT

Methods of providing a homogeneous or uniform catalytic coating on an inorganic fiber substrate include using a vacuum to coat the substrate, improved coating solutions or mixtures and/or drying methods to prevent migration of metal catalyst precursors to the exterior surfaces and edges of the inorganic fiber substrate. The methods may include adding a component to the first coating solution or mixture before coating the inorganic fiber substrate; applying a second coating solution or mixture to the coated inorganic fiber substrate; drying the coated inorganic fiber substrate at ambient conditions, under controlled conditions, or with microwave radiation; or optimizing an amount of a salt, water, or an organic solvent in the coating solution.

22 Claims, 14 Drawing Sheets

(51) Int. Cl.
*B01J 23/44* (2006.01)
*B01J 23/46* (2006.01)
*B01J 23/63* (2006.01)
*B01J 35/00* (2006.01)
*B01J 35/06* (2006.01)
*B01J 37/00* (2006.01)
*B01J 37/02* (2006.01)
*B01J 37/08* (2006.01)
*B01J 37/10* (2006.01)
*B01J 37/34* (2006.01)

(52) U.S. Cl.
CPC .......... *B01J 35/0006* (2013.01); *B01J 35/06* (2013.01); *B01J 37/0009* (2013.01); *B01J 37/0217* (2013.01); *B01J 37/0219* (2013.01); *B01J 37/0244* (2013.01); *B01J 37/082* (2013.01); *B01J 37/10* (2013.01); *B01J 37/346* (2013.01)

(58) Field of Classification Search
CPC .... B01J 35/06; B01J 37/0009; B01J 37/0217; B01J 37/0219; B01J 37/0244; B01J 37/082; B01J 37/10; B01J 37/346
USPC ......................... 502/300, 304, 332–334, 339
See application file for complete search history.

(56) References Cited

U.S. PATENT DOCUMENTS

| | | | |
|---|---|---|---|
| 2,461,841 A | 2/1949 | Nordbert | |
| 2,491,761 A | 12/1949 | Parker et al. | |
| 2,500,092 A | 3/1950 | Parker et al. | |
| 2,624,658 A | 1/1953 | Parker et al. | |
| 2,635,390 A | 4/1953 | Parker | |
| 2,686,954 A | 8/1954 | Parker | |
| 2,718,461 A | 9/1955 | Parker et al. | |
| 2,730,475 A | 1/1956 | Parker | |
| 4,177,168 A | 12/1979 | Denny et al. | |
| 5,100,632 A | 3/1992 | Dettling et al. | |
| 5,176,857 A | 1/1993 | Stacey et al. | |
| 5,332,699 A | 7/1994 | Olds et al. | |
| 5,585,312 A | 12/1996 | TenEyck et al. | |
| 5,714,421 A | 2/1998 | Olds et al. | |
| 5,811,360 A | 9/1998 | Jubb | |
| 5,821,183 A | 10/1998 | Jubb | |
| 5,874,375 A | 2/1999 | Zoitos et al. | |
| 5,928,975 A | 7/1999 | Jubb | |
| 5,955,389 A | 9/1999 | Jubb | |
| 6,025,288 A | 2/2000 | Zoitos et al. | |
| 6,030,910 A | 2/2000 | Zoitos et al. | |
| 6,191,067 B1 | 2/2001 | Koike et al. | |
| 6,284,201 B1 | 9/2001 | Buck | |
| 6,861,381 B1 | 3/2005 | Jubb et al. | |
| 6,953,757 B2 | 10/2005 | Zoitos et al. | |
| 7,153,796 B2 | 12/2006 | Jubb et al. | |
| 7,259,118 B2 | 8/2007 | Jubb et al. | |
| 7,601,671 B2 | 10/2009 | LaBarge | |
| 7,638,459 B2 | 12/2009 | Rende et al. | |
| 7,781,372 B2 * | 8/2010 | Liu | C04B 35/638 502/429 |
| 8,211,823 B2 * | 7/2012 | Liang | B01J 23/002 502/328 |
| 8,535,632 B2 * | 9/2013 | Chase | B01J 23/464 502/344 |
| 2003/0106311 A1 | 6/2003 | Moore, III et al. | |
| 2003/0165638 A1 * | 9/2003 | Louks | F01N 3/0222 427/376.1 |
| 2005/0227058 A1 | 10/2005 | Ohashi et al. | |
| 2006/0048501 A1 | 3/2006 | Rasmussen | |
| 2006/0177629 A1 | 8/2006 | Kunieda | |
| 2011/0052467 A1 | 3/2011 | Chase et al. | |
| 2012/0003386 A1 * | 1/2012 | Bockmeyer | C07F 5/003 427/372.2 |
| 2012/0049114 A1 | 3/2012 | Seeker et al. | |
| 2012/0258855 A1 * | 10/2012 | Dekker | B01J 35/1023 502/355 |
| 2015/0251163 A1 | 9/2015 | Ohshima et al. | |
| 2015/0375211 A1 * | 12/2015 | Ross | C01B 3/40 502/328 |
| 2016/0244001 A1 | 8/2016 | Chauhan et al. | |
| 2017/0198622 A1 | 7/2017 | Creedon et al. | |
| 2017/0304814 A1 | 10/2017 | Homma et al. | |
| 2019/0270081 A1 | 9/2019 | Ilinich et al. | |
| 2019/0309455 A1 | 10/2019 | Cross et al. | |
| 2020/0308760 A1 | 10/2020 | Alvarez Lainez et al. | |

FOREIGN PATENT DOCUMENTS

| | | |
|---|---|---|
| GB | 1382984 A | 2/1975 |
| GB | 1501381 A | 2/1978 |
| WO | WO 2005/049203 A2 | 6/2005 |
| WO | WO 2009/052274 A1 | 4/2009 |
| WO | WO 2011/092525 A1 | 8/2011 |
| WO | WO 2011/127095 A2 | 10/2011 |
| WO | WO 2016/080551 A1 | 5/2016 |

OTHER PUBLICATIONS

International Search Report and Written Opinion issued by the United States Patent and Trademark Office as International Searching Authority for PCT/US2021/051266, dated Mar. 25, 2022. (12 pgs.).

Invitation to Pay Additional Fees and, Where Applicable, Protest Fee received in International Application No. PCT/US2021/051266, dated Dec. 15, 2021, 2 pages.

\* cited by examiner

HOMOGENEOUS CATALYTIC FIBER COATINGS AND METHODS OF PREPARING SAME

CROSS-REFERENCE TO RELATED APPLICATIONS

This application claims priority to U.S. Provisional Application No. 63/081,110 filed Sep. 21, 2020, entitled "Coating Fibrous Materials with Controlled Dose of Coating Mixture," and U.S. Provisional Application No. 63/107,240 filed Oct. 29, 2020, entitled "Homogeneous Catalytic Fiber Coatings and Methods of Preparing Same," the disclosures of each are hereby incorporated by reference in their entirety.

TECHNICAL FIELD

The present disclosure relates generally to methods of providing a homogeneous or uniform catalytic coating on an inorganic fiber substrate. In particular, the present disclosure describes methods of providing an even coating on the inorganic fiber substrate and to prevent migration of metal catalyst precursors (e.g., salts or complexes of the metal catalyst) to the exterior surfaces and edges of the inorganic fiber substrate using improved coating solutions or mixtures (e.g. suspensions and/or colloids) and/or drying methods.

BACKGROUND

There is a strong interest to improve the catalytic function and efficiency of emission control and industrial catalyst devices. Such improvements can yield better environmental control through reduced harmful emissions. Further, the higher efficiency of the applied catalyst can reduce the overall size of the devices and the production costs.

Many manufacturing, industrial and other processes generate waste gases which must be processed to some degree prior to discharge into the environment. For example, electrical power generation is sometimes performed by combusting carbon-based fuels to generate heat, which can be converted into electricity via steam turbines. Similarly, concrete and glass production plants combust fuels to generate heat as part of the production processes. Further, internal combustion engines, which may be used in numerous systems, generate electrical and/or motive power by combusting fuels, such as gasoline or diesel fuel. All of these processes are capable of generating waste gases which must be processed to a degree prior to discharge to the environment.

These waste gases may include carbon monoxide, carbon dioxide, nitrogen oxides, nitrous oxides, sulfur oxides, hydrogen chloride, hydrogen fluoride, arsenic, boron, lead, mercury, and other harmful gases (e.g., unburned hydrocarbons and volatile organic compounds) and/or particles. Some or all of these undesirable components of waste gases may be removed by various conventional techniques, many of which involve filters and/or catalyst supports which may physically remove and/or chemically alter the undesirable components prior to discharge to the environment.

Accordingly, methods have been developed to prepare substrates with materials that can be considered to be catalytically active, offer functionality such as oxygen storage, act as sorbents for different species such as carbon dioxide, catalyze chemical reactions, or provide stabilizing benefits to other materials in the coating that provide performance benefits or ensure performance over extended periods of time, including elements that reduce the impact of poisoning from species such as carbon coke or sulfur. It is considered ideal that these materials are present as an even, uniform coating across the surface of the substrate to maximize performance and functionality. Materials that are less well dispersed could find reduced effectiveness due to gas or liquids passing blind spots (areas where there is no material present and therefore the intended reaction does not take place), localized heavy material loading that reduces the open area of the material and reduces the availability for reaction, or poor dispersion of materials that might be needed to support the reaction such as proximity of material and the sorbent element on a molecular level.

Typically, aqueous solutions of water-soluble compounds or complexes of a metal catalyst are used. After treatment of the substrate with the aqueous metal solution, the substrate is dried, for example, by heat treatment of the substrate at an elevated temperature (for example, 100-150° C.) for a certain period of time (for example, 1-3 hours) and then calcined to convert the metal catalyst precursors into a more catalytically active form. An example of a calcination process includes heat treatment in air at a temperature of about 400-600° C. for 1-8 hours.

Conventional treatment methods deposit metal catalyst precursors on substrates by wet chemistry methods, such as precipitation of platinum ions and/or palladium ions from solution onto the substrate. These methods, however, allow the metal catalyst precursors to migrate from the center of the substrate to the edges of the substrate and from the interior of the substrate to the exterior of the substrate because of the solubility of the metal catalyst precursors in the solvent.

Conventional drying (e.g., oven drying) also causes metal catalyst precursors to migrate from the interior of the substrate to the exterior surface of the substrate, and from the center of the substrate to the edges of the substrate. With conventional convection drying, species in solution migrate from the wet interior surfaces towards the dry exterior surfaces.

Testing has shown that catalyzed fibers offer a number of advantages over traditional designs. These advantages include reducing the overall catalyst load, which is significant due to the cost of platinum group metals (PGMs) typically used as catalysts. The fibrous material offers enhanced surface area that allows for increased conversion, for example of waste gases. A further advantage of fiber-based designs is reduced weight, which can provide faster light off and earlier reaction activity that reduces the cost of industrial units and can reduce the release of harmful emissions in emission control applications from start up. The reduced weight also means that fewer supports are needed. Lastly, fiber-based designs can yield devices with lower back pressure or pressure drop, which leads to better fuel efficiency and less pressure on industrial pump units.

Existing methods attempt to coat fiber mats using dipping baths, spray systems, or liquid curtains to ensure thorough coverage of the fiber mats. These processes yield inconsistent results as fiber layers of different densities collect different amounts of liquid. These processes are also wasteful as they use an excessive amount of liquid and the liquid drips from the base and sides of the fiber mat due to handling and/or moving the coated material. Further, material may be lost when adding a second liquid containing additives, such as chelates, by displacement. Moreover, these processes require an increased amount of wet fiber handling that could potentially damage the fiber and/or reduce the evenness of coating.

Thus, there is a continuing need for improved materials and methods that provide more uniform catalytically active coatings.

BRIEF DESCRIPTION OF THE DRAWINGS

The following figures are included to illustrate certain aspects of the present disclosure and should not be viewed as an exclusive embodiment. The subject matter disclosed is capable of considerable modification, alteration, and equivalents in form and function, as will occur to those of ordinary skill in the art and having the benefit of this disclosure.

DETAILED DESCRIPTION

Figure 1:
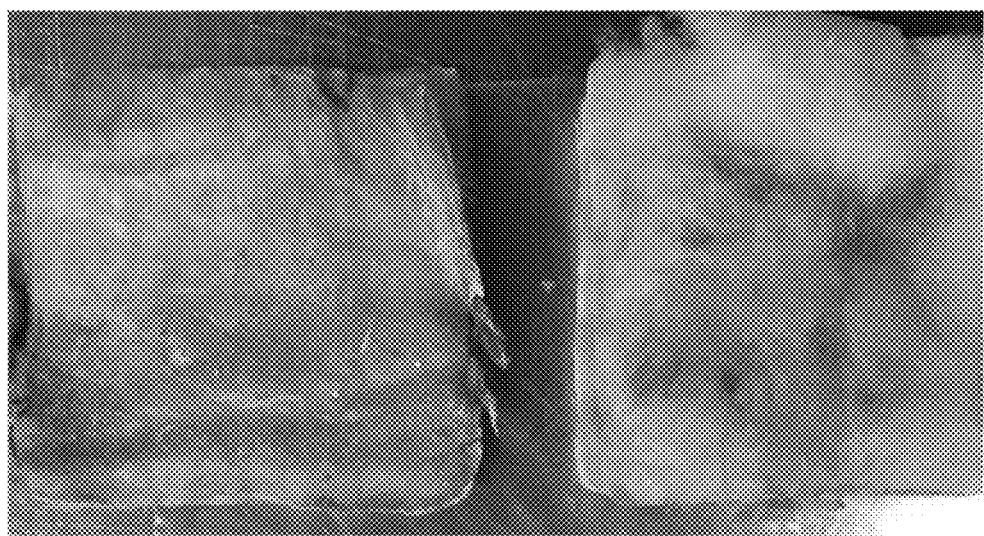
FIG. 1 illustrates a segment of the fiber sheet of Example 1.

The present disclosure describes improved methods of preparing catalytically active fiber compositions. The catalytically active fiber compositions include an inorganic fiber substrate and a catalytically active metal applied onto or incorporated into a least a portion of the inorganic fibers of the inorganic fiber substrate.

By "applied onto" the inorganic fibers, what is meant is that the catalytically active metal is applied to the inorganic fibers at some point subsequent to forming the inorganic fibers. By "incorporated into" is meant that the catalytically active metal is added to an inorganic fiber precursor formulation at some point prior to forming the inorganic fibers. A non-limiting example includes coating the catalytically active agent onto the inorganic fibers after completion of the inorganic fiber production process, such as by spraying a liquid form of the catalytically active agent, or otherwise coating the catalytically active metal, onto the inorganic fibers. The catalytically active metal may additionally or alternatively be applied before, during or after any suitable step of the inorganic fiber production process.

According to various embodiments, the inorganic fibers are coated with a controlled dose of a precursor of a catalytically active metal. In certain embodiments, a coating solution or mixture is applied to the inorganic fibers by introducing the inorganic fibers into a solution or mixture containing various salts of catalytically active metals. In some embodiments, a coating solution is applied to the fiber by soaking the fiber in an excess volume of solution. In some embodiments, the inorganic fibers are coated by placing the inorganic fiber substrate and the coating solution or mixture into a container and applying a vacuum to the container.

A number of methods have been developed to ensure that maximum dispersion of the catalytically active metals on the inorganic fibers is maintained. For example, various secondary treatments may be used to prevent the migration of the precursors of the catalytically active metals to the edge of the inorganic fibers. In one embodiment, the secondary treatment involves the use of a chelating agent such as tetraammonium ethylenediaminetetraacetic acid (EDTA) or other EDTA-containing species to control precipitation of the catalytically active metal. In another embodiment, the pH of the coated inorganic fibers may be altered to control precipitation of the catalytically active metal.

In yet another embodiment, coated inorganic fibers, soaked in a solution of one or more metallic salts in one or more solvent systems, and optionally treated with a secondary agent, are dried at a range of temperatures, pressures, and other conditions over various periods of time. In some instances, the drying method includes applying heat to the coated inorganic fibers at ambient temperatures or at elevated temperatures up to and including 600° C. at standard pressures in stagnant or steam-rich environments. In other embodiments, the drying method includes evaporating the solvent at ambient pressure or under reduced pressures. In some embodiments, the drying method includes applying microwave radiation to the coated inorganic fibers. In one or more embodiments, the drying method includes one or a combination of the drying methods described above.

In certain embodiments, the dried, coated inorganic fibers are calcined to temperatures up to 1000° C. In some embodiments, the calcination occurs over various temperature ramps to the temperatures described herein. In one or more embodiments, the calcination may ramp up to a given temperature in the range described and held for a predetermined amount of time before ramping to a second discrete temperature for a discrete time period.

In one or more embodiments, the inorganic fiber substrate is pre-treated (e.g., heat-treated or treated with a chemical) before it is coated with the coating solution or mixture. In some embodiments, the inorganic fiber substrate is pre-treated and then coated (i.e., no secondary treatment). In other embodiments, the inorganic fiber substrate is pre-treated, then coated, and subsequently treated with a secondary agent.

In one or more embodiments, the inorganic fiber substrate is coated only (i.e., no pre-treatment or secondary treatment). In several embodiments, the inorganic fiber substrate is coated and subsequently treated with a secondary agent (i.e., no pre-treatment). One of ordinary skill in the art with the benefit of this disclosure understands that the different methods described above can be combined in several different ways to provide a homogeneous or uniform coating on the substrate.

The form of the inorganic fiber substrate is not particularly limited and may be in the form of a web of fibers, a fiber blanket, a fiber mat, a needled fiber blanket, or a needled fiber mat. In certain embodiments, the inorganic fiber substrate is presented as a vacuum formed shape, an ultra-thin paper having an area density of about 50 grams per square meter (GSM) to about 400 GSM, a fiber blanket having an area density of about 100 GSM to about 2000 GSM, or as a coating inside a product form/frame. In several embodiments, the fibers are prepared in a continuous fashion. In other embodiments, the fiber can be coated in a batch process.

In several embodiments, the catalytically active fiber compositions may be prepared as, formed into, or incorporated into various product forms. The product forms may include, without limitation, fiber aggregates, composite materials, filter elements, catalytic elements, components of exhaust systems, catalytic support materials, papers, blankets, mats, sheets, felts, textiles, or films. These various product forms are described in U.S. Patent Application Publication No. 2019/0309455, the entire disclosure of which is incorporated herein by reference.

Advantageously, the methods described herein have the ability to coat inorganic fibers with catalytically active metals that ensures even dispersion of the metals to maximize performance. Other benefits of the methods include the potential to reduce the amount of catalytically active metal used, the potential to reduce the size of the product form, and the potential to improve selectivity of the product form. For example, the product form, size, shape, and position may be modified to yield further performance benefits such as reducing the size of the unit or placing the device close to the heat source to accelerate conversion of harmful gases.

Catalytically Active Fiber Compositions
Inorganic Fibers of the Inorganic Fiber Substrate In several embodiments, the inorganic fibers of the inorganic fiber substrate include inorganic fibers that are capable of adsorbing a coating solution or mixture of precursors of catalytically active metals. Inorganic fibers that may be used in the present disclosure include those described in U.S. Patent Application Publication No. 2019/0309455, the entire disclosure of which is incorporated herein by reference. For instance, the inorganic fibers may include porous inorganic fibers capable of adsorbing the coating solution or mixture onto the surface of the fibers. In certain embodiments, the inorganic fibers include at least one of inorganic oxide fibers, ceramic fibers, refractory ceramic fibers, polycrystalline wool fibers, alumina fibers, high alumina fibers, glass fibers, silica fibers, boehmite fibers, low-biopersistence fibers, alkaline earth silicate fibers, calcia-alumina fibers, ceria fibers, zirconia fibers, or titania fibers.

In various embodiments, the inorganic fibers have at least one of: (i) a surface area of at least 5 $m^2/g$; (ii) porosity of at least 5% by volume; or (iii) a pore volume of at least 0.005 mL/g. In an exemplary embodiment, the inorganic fibers have a surface area of greater than 90 $m^2/g$ and have a pore size of about 60 angstroms (0.006 μm). In some embodiments, the inorganic fibers include a high content of alumina (e.g., greater than 95 weight percent) and some silica (e.g., about 5 weight percent). In another exemplary embodiment, the inorganic fibers include a high surface area gamma alumina.

In certain embodiments, the inorganic fibers may be produced by any known methods for producing inorganic fibers. In some embodiments, the inorganic fibers may be produced via sol-gel processes. An exemplary sol-gel fiber production process includes: (1) forming a solution or sol containing the proportions of the desired metal salts or compounds as needed; (2) including in the solution or sol a spinning aid, such as an organic polymer, to provide the needed rheology for fiberization; (3) including in the solution or sol any other materials deemed desirable for the finished product (including, but not limited, to: phase-change inhibitors or metal oxide powders for performance enhancement and/or dopants for improving adhesion of catalytically active metals to the inorganic fibers); (4) fiberizing the resulting material from the solution or sol by established fiberization methods, which may include but are not limited to: (i) providing the solution or sol to a rotary disk, where it may be centrifugally extruded into fibers, referred to as "spinning", (ii) providing the solution or sol to an extrusion nozzle (or an assembly thereof) and extruding the solution or sol, with or without an attenuating air stream, as a continuous or discontinuous fiber, and (iii) electrospinning; (5) subjecting the resulting fibers to a drying and calcination step, to remove water, residual organic components, and volatile salt anions; and (6) subjecting the fibers to a further heat treatment to develop a crystal structure.

In certain embodiments, the inorganic fibers may include ceramic fibers. Without limitation, suitable ceramic fibers include alumina fibers, alumino-silicate fibers, alumina-boria-silicate fibers, alumina-zirconia-silicate fibers, zirconia-silicate fibers, zirconia fibers and similar fibers. A suitable alumina-silicate ceramic fiber is commercially available from Unifrax I LLC (Tonawanda, N.Y., USA) under the registered trademark FIBERFRAX. The FIBERFRAX refractory ceramic fibers include the fiberization product of 45 to 75 weight percent alumina and 25 to 55 weight percent silica. The FIBERFRAX fibers exhibit operating temperatures of up to 1540° C. and a melting point of up to 1870° C.

In certain embodiments, the alumino-silicate fibers may include: from 40 weight percent to 60 weight percent $Al_2O_3$ and from 40 weight percent to 60 weight percent $SiO_2$; 50 weight percent $Al_2O_3$ and 50 weight percent $SiO_2$; 30 weight percent $Al_2O_3$ and 70 weight percent $SiO_2$; from 45 to 51 weight percent $Al_2O_3$ and from 46 to 52 weight percent $SiO_2$; or from 30 to 70 weight percent $Al_2O_3$ and from 30 to 70 weight percent $SiO_2$.

In certain embodiments, the inorganic fibers may include an alumino-silica-magnesia glass fiber including from 64 weight percent to 66 weight percent $SiO_2$, from 24 weight percent to 25 weight percent $Al_2O_3$, and from 9 weight percent to 10 weight percent MgO.

Without limitation, suitable examples of low-biopersistence fibers include those fibers disclosed in U.S. Pat. Nos. 6,953,757, 6,030,910, 6,025,288, 5,874,375, 5,585,312, 5,332,699, 5,714,421, 7,259,118, 7,153,796, 6,861,381, 5,955,389, 5,928,975, 5,821,183, and 5,811,360, the entire disclosures of which are incorporated herein by reference.

Suitable low-biopersistence fibers include, without limitation, alkaline earth silicate fibers, such as calcia-magnesia-silicate fibers or magnesia-silicate fibers, calcia-aluminate fibers, potassia-calcia-aluminate fibers, potassia-alumina-silicate fibers, or sodia-alumina-silicate fibers.

In certain embodiments, the alkaline earth silicate fibers may include the fiberization product of a mixture of oxides of magnesium and silica. These fibers are commonly referred to as magnesium-silicate fibers. The magnesium-silicate fibers may include the fiberization product of: from 60 to 90 weight percent silica, from greater than 0 to 35 weight percent magnesia and 5 weight percent or less impurities; from 65 to 86 weight percent silica, from 14 to 35 weight percent magnesia and 5 weight percent or less impurities; or from 70 to 86 weight percent silica, from 14 to 30 weight percent magnesia, and 5 weight percent or less impurities. A suitable magnesium-silicate fiber is commercially available from Unifrax I LLC (Tonawanda, N.Y., USA) under the registered trademark ISOFRAX. Commercially available ISOFRAX fibers generally include the fiberization product of from 70 to 80 weight percent silica, from 18 to 27 weight percent magnesia and 4 weight percent or less impurities. In certain embodiments, the fibers include the fiberization product of 85 weight percent silica and 15 weight percent magnesia.

In certain embodiments, the alkaline earth silicate fibers may include the fiberization product of a mixture of oxides of calcium, magnesium and silica. These fibers are commonly referred to as calcia-magnesia-silicate fibers. In certain embodiments, the calcia-magnesia-silicate fibers include the fiberization product of: from 45 to 90 weight percent silica, from greater than 0 to 45 weight percent calcia, from greater than 0 to 35 weight percent magnesia, and 10 weight percent or less impurities; or greater than 71.25 to 85 weight percent silica, greater than 0 to 20 weight percent magnesia, 5 to 28.75 weight percent calcia, and 0 to 5 weight percent zirconia.

Suitable calcia-magnesia-silicate fibers include those commercially available from Unifrax I LLC (Tonawanda, N.Y., USA) under the registered trademark INSULFRAX. In certain embodiments, the calcia-magnesia-silicate fibers include the fiberization product of: from 61 to 67 weight percent silica, from 27 to 33 weight percent calcia, and from 2 to 7 weight percent magnesia. In certain embodiments, the calcia-magnesia-silicate fibers include 79 weight percent silica, 18 weight percent calcia, and 3 weight percent magnesia. Other suitable calcia-magnesia-silicate fibers include those commercially available from Thermal Ceramics (Augusta, Ga.) under the trade designations SUPERWOOL 607, SUPERWOOL 607 MAX and SUPERWOOL HT. SUPERWOOL 607 fibers include from 60 to 70 weight percent silica, from 25 to 35 weight percent calcia, from 4 to 7 weight percent magnesia, and trace amounts of alumina. SUPERWOOL 607 MAX fibers include 60 to 70 weight percent silica, from 16 to 22 weight percent calcia, and from 12 to 19 weight percent magnesia, and trace amounts of alumina. SUPERWOOL HT fibers include 74 weight percent silica, 24 weight percent calcia and trace amounts of magnesia, alumina and iron oxide.

In certain embodiments, the alkaline earth silicate fibers may include the fiberization product of a mixture of oxides of calcium and aluminum. In certain embodiments, at least 90 weight percent of the calcia-aluminate fibers include the fiberization product of: from 50 to 80 weight percent calcia, from 20 to less than 50 weight percent alumina, and 10 weight percent or less impurities; or from 50 to 80 weight percent alumina, from 20 to less than 50 weight percent calcia, and 10 weight percent or less impurities. In certain embodiments, the alkaline earth silicate fibers may include the fiberization product of a mixture of oxides of potassium, calcium and aluminum ("potassia-calcia-aluminate fibers"). In certain embodiments, the potassia-calcia-aluminate fibers include the fiberization product of from 10 to 50 weight percent calcia, from 50 to 90 weight percent alumina, from greater than 0 to 10 weight percent potassia, and 10 weight percent or less impurities.

In certain embodiments, the alkaline earth silicate fibers may include the fiberization product of a mixture of oxides of magnesium, silica, lithium and strontium. In certain embodiments, the alkaline earth silicate fibers include: 65 to 86 weight percent silica, 14 to 35 weight percent magnesia, lithium oxide and strontium oxide; 65 to 86 weight percent silica, 14 to 35 weight percent magnesia, greater than 0 to 1 weight percent lithium oxide and greater than 0 to 5 weight percent strontium oxide; 14 to 35 weight percent magnesia, and greater than 0 to 0.45 weight percent lithium oxide; 14 to 35 weight percent magnesia, and greater than 0 to 5 weight percent strontium oxide; or 70 or greater weight percent silica, magnesia, and greater than 0 to 10 weight percent iron oxide.

Suitable silica fibers include leached glass fibers available from BelChem Fiber Materials GmbH, Germany, under the trademark BELCOTEX, from Hitco Carbon Composites, Inc. of Gardena Calif., under the registered trademark REFRASIL, and from Polotsk-Steklovolokno, Republic of Belarus, under the designation PS-23(R).

The BELCOTEX fibers are standard type, staple fiber pre-yarns. These fibers have an average fineness of 550 tex and are generally made from silicic acid modified by alumina. The BELCOTEX fibers are amorphous and generally contain 94.5 percent silica, 4.5 percent alumina, less than 0.5 percent sodium oxide, and less than 0.5 percent of other components. These fibers have an average diameter of 9 microns and a melting point in the range of 1500° C. to 1550° C. These fibers are heat resistant to temperatures of up to 1100° C. and are typically shot free and binder free.

The REFRASIL fibers, like the BELCOTEX fibers, are amorphous leached glass fibers high in silica content for providing thermal insulation for applications in the 1000° C. to 1100° C. temperature range. These fibers are between 6 and 13 microns in diameter, and have a melting point of 1700° C. The fibers, after leaching, typically have a silica content of 95 percent by weight. Alumina may be present in an amount of 4 percent by weight with other components being present in an amount of 1 percent or less.

The PS-23 (R) fibers from Polotsk-Steklovolokno are amorphous glass fibers high in silica content and are suitable for thermal insulation in applications requiring resistance to at least 1000° C. These fibers have a length in the range of 5 to 20 mm and a diameter of 9 microns. These fibers, like the REFRASIL fibers, have a melting point of 1700° C.

In certain embodiments, the glass fibers may include the fiberization product of 63 to 67 weight percent $SiO_2$, 3 to 5 weight percent $Al_2O_3$, 4 to 7 weight percent CaO, 2 to 4 weight percent MgO, 4 to 7 weight percent $B_2O_3$, 14 to 17 weight percent $Na_2O$, greater than 0 to 2 weight percent $K_2O$, greater than 0 to 1 weight percent ZnO, greater than 0 to 1 weight percent $Fe_2O_3$, greater than 0 to 1 weight percent BaO, and greater than 0 to 1 weight percent $F_2$.

In certain embodiments, the glass fibers may include E-glass fibers. E-glass fibers may include from 52 weight percent to 56 weight percent $SiO_2$, from 16 weight percent to 25 weight percent CaO, from 12 weight percent to 16 weight percent $Al_2O_3$, from 5 weight percent to 10 weight percent $B_2O_3$, up to 5 weight percent MgO, up to 2 weight percent of sodium oxide and potassium oxide and trace amounts of iron oxide and fluorides, e.g., a composition of 55 weight percent $SiO_2$, 15 weight percent $Al_2O_3$, 7 weight percent $B_2O_3$, 3 weight percent MgO, 19 weight percent CaO and traces of the above mentioned materials.

Suitable glass fibers having physical properties such as high specific surface area, high tensile strength, consistent glass chemistry and purity are available from Unifrax Specialty Fibers (Tonawanda N.Y., USA). These fibers are produced by rotary and flame attenuation manufacturing processes. Average fiber diameters range from an extremely fine 0.25 μm to 5.0 μm. Examples of glass fiber compositions are set forth in Table 1 below.

TABLE 1

Glass Fiber Compositions (% by weight)

| | Glass A | Glass B | Glass C | Glass E |
|---|---|---|---|---|
| $SiO_2$ | 68.0-71.0 | 55.0-60.0 | 63.0-67.0 | 50.0-56.0 |
| $Al_2O_3$ | 2.5-4.0 | 4.0-7.0 | 3.0-5.0 | 13.0-16.0 |
| $B_2O_3$ | <0.09* | 8.0-11.0 | 4.0-7.0 | 5.8-10.0 |
| $Na_2O$ | 10.5-12.0 | 9.5-13.5 | 14.0-17.0 | <0.50 |
| $K_2O$ | 4.5-6.0 | 1.8-4.0 | <2.0 | <0.40 |
| CaO | 5.0-7.0 | 2.8-5.0 | 4.0-7.0 | 15.0-24.0 |
| MgO | 2.0-4.0 | <2.0 | 2.0-4.0 | <5.5 |
| $Fe_2O_3$ | <0.20 | <0.20 | <0.20 | <0.50 |
| ZnO | <2.0 | 2.0-5.0 | <0.10 | <0.02 |
| BaO | — | 3.0-6.0 | <0.10 | <0.03 |
| $F_2$ | — | <1.0 | <1.0 | <1.0 |
| $TiO_2$ | — | — | — | <1.0 |

*$B_2O_3$ contains 31.1% boron by weight. The maximum allowable boron content in A-Glass is 0.028%.

Glass fibers may be converted into a high silica fiber by extracting therefrom the monovalent, divalent, and trivalent glass-forming metal oxide constituents to leave a fiber composed essentially of silica and containing a ratio of less than 10 parts of such metal oxides to 90 parts of $SiO_2$ and even as low as 1 or 2 parts of such oxides, the remaining oxide portion being $SiO_2$. This is accomplished by leaching the fibers, either in loose masses or in fabricated form with acids, other than phosphorous or phosphoric acid, which attack $SiO_2$, for a time and at a temperature sufficient to extract substantially all of the oxides other than silica. The treated fibers are then washed substantially free of acid and may be heated at an elevated temperature to dehydrate and shrink the fibers, if desired. The above process results in shrinkage of fibers both in diameter and longitudinally.

Suitable leaching acids include for example, HCl, $H_2SO_4$, $HNO_3$, acetic, chloroacetic, and chlorinated low molecular weight fatty acids, for example, trichloroacetic acid. The strength of the acid may be varied over a wide range, for example from 0.1 N to 5 N or higher. The leaching process may take place at elevated temperature ranging from 100° F. up to the boiling point of the acid, or above the boiling point by conducting the leaching in an autoclave under super-atmospheric pressure.

It may be desirable to shrink the fibers by dehydration at elevated temperatures for a time sufficient to remove substantially all of the water of hydration and all adsorbed water, by heating, such as to a temperature of 400° F. to 500° F. for a time sufficient to remove water of hydration and adsorbed water without materially shrinking the fibers.

Borosilicate glass fibers may be readily leached with acid to remove the metal oxides other than silica, and may be dehydrated by heating to temperatures of above 1000° F., for example, in the range of 1400° F. to 1600° F. By proper control of the acid extraction process, the resultant fibers after firing contain a high silica content and may be as high as 90% or 99.9% silica as determined by a hydrofluoric acid extraction method.

Methods for the preparation of silica fibers are disclosed in U.S. Pat. Nos. 2,215,039, 2,221,709, 2,461,841, 2,491,761, 2,500,092, 2,624,658, 2,635,390, 2,686,954, 2,718,461, and 2,730,475, the entire disclosures of which are incorporated herein by reference.

In certain embodiments, the inorganic fibers may include refractory ceramic fibers including the fiberization product of 45 to 75 weight percent alumina and 25 to 55 weight percent silica.

In certain embodiments, the inorganic fibers may include alkaline earth silicate fibers including the fiberization product of 60 to 90 weight percent silica, greater than 0 to 35 weight percent magnesia, and 5 weight percent or less impurities.

In certain embodiments, the inorganic fibers may include alkaline earth silicate fibers including the fiberization product of 45 to 90 weight percent silica, greater than 0 to 45 weight percent calcia, greater than 0 to 35 weight percent magnesia, and 10 weight percent or less impurities.

In certain embodiments, the inorganic fibers may include alkaline earth silicate fibers including the fiberization product of calcia and silica.

In certain embodiments, the inorganic fibers may include calcia-alumina fibers including 20 to 80 weight percent calcia and 20 to 80 weight percent alumina.

In certain embodiments, the inorganic fibers may include silica fibers including 90 weight percent or greater silica.

In certain embodiments, the inorganic fibers may include alumina fibers including 90 weight percent or greater alumina.

In certain embodiments, the inorganic fibers may include polycrystalline wool fibers including the fiberization product of 95 to 97 weight percent alumina and 3 to 5 weight percent silica.

In certain embodiments, the inorganic fibers may be present in the catalytically active fiber composition in an amount of 20 to 100 percent by weight, based on the total weight of the catalytically active fiber composition. In embodiments in which the inorganic fibers include a catalytically active metal incorporated into the inorganic fibers, such inorganic fibers may include up to 100 percent by weight of the catalytically active fiber composition, based on the total weight of the catalytically active fiber composition. In certain embodiments, the inorganic fibers may be present in the catalytically active fiber composition in an amount such that the amount of inorganic fiber present in the catalytically active fiber composition and the amount of catalytically active metal present in the catalytically active fiber composition together equal the entire weight of the catalytically active fiber composition. In certain embodiments, the inorganic fibers may be present in the catalytically active fiber composition in an amount such that the amount of inorganic fibers present in the catalytically active fiber composition, the amount of catalytically active metal present in the catalytically active fiber composition, and the amount of any other components described herein present in the composition together equal the entire weight of the catalytically active fiber composition.

Catalytically Active Metals

In various embodiments, any transition metal, alkali metal, alkaline earth metal, and/or rare earth metal may be used as the catalytically active metal in the coating solution or mixture. In certain embodiments, the catalytically active metal or metal catalyst includes at least one of platinum (Pt), rubidium (Rb), antimony (Sb), copper (Cu), silver (Ag), palladium (Pd), ruthenium (Ru), bismuth (Bi), zinc (Zn), nickel (Ni), cobalt (Co), chromium (Cr), cerium (Ce), titanium (Ti), iron (Fe), vanadium (V), gold (Au), tin (Sn), tungsten (W), potassium (K), rhodium (Rh), iridium (Ir), osmium (Os), or manganese (Mn), as well as oxides, alloys, or combinations thereof. In an exemplary embodiment, the catalytically active metal is a PGM. As used herein, "PGM" refers to platinum group metals or their oxides, including Pt, Pd, Ru, Rh, Os, Ir and mixtures thereof. In another exemplary embodiment, the catalytically active metal includes a combination of Ce, Pd, and Rh, as well as other non-active supporting elements that support the thermal/chemical durability of the catalytic metal elements such as zirconium (Zr), lanthanum (La), and barium (Ba). In yet another exemplary embodiment, the catalytically active metal includes a combination of Pt and Sn.

In certain embodiments, the catalytically active metal may be present in the catalytically active fiber composition in an amount of greater than 0 to 50 percent by weight, based on the total weight of the catalytically active fiber composition. In certain embodiments, the catalytically active metal may be present in the catalytically active fiber composition in an amount such that the amount of the catalytically active metal present in the catalytically active fiber composition and the amount of inorganic fibers present in the catalytically active fiber composition together equal the entire weight of the catalytically active fiber composition. In certain embodiments, the catalytically active metal may be present in the catalytically active fiber composition in an amount such that the amount of catalytically active metal present in the catalytically active fiber composition, the amount of inorganic fibers present in the catalytically active composition, and the amount of any other components described herein present in the catalytically active fiber composition together equal the entire weight of the catalytically active fiber composition.

In certain embodiments, the catalytically active metal may be present in the catalytically active fiber composition in an amount, based on the total weight of the catalytically active fiber composition of 0.01 to 50 percent by weight, 0.05 to 50 percent by weight, 0.1 to 50 percent by weight, 0.5 to 50 percent by weight, 1 to 50 percent by weight, 2 to 50 percent by weight, 3 to 50 percent by weight, 4 to 50 percent by weight, 5 to 50 percent by weight, 6 to 50 percent by weight, 7 to 50 percent by weight, 8 to 50 percent by weight, 9 to 50 percent by weight, or 10 to 50 percent by weight.

Other Components of the Catalytically Active Fiber Composition

In certain embodiments, the catalytically active fiber composition of any of the above embodiments may further include a blend of different inorganic fiber compositions. In certain embodiments, the catalytically active fiber composition of any of the above embodiments may further include secondary inorganic fibers. The secondary inorganic fibers may differ from the inorganic fibers described above in any one or more of the features of the inorganic fibers. Specifically, in the various embodiments described above, the inorganic fibers may be characterized in any number of ways. It is to be understood that, if the secondary inorganic fibers are included in any of the embodiments described above, they may differ from the inorganic fibers in that they have one or more features, which are mutually exclusive from the features of the inorganic fibers in the particular embodiment in which the secondary inorganic fibers may be included.

In certain embodiments, the secondary inorganic fibers may be present in the catalytically active fiber composition in an amount, based on the total weight of the catalytically active fiber composition, of up to 80 percent by weight, 1 to 80 percent by weight, 5 to 80 percent by weight, 10 to 80 percent by weight, 15 to 80 percent by weight, 20 to 80 percent by weight, 25 to 80 percent by weight, 30 to 80 percent by weight, 35 to 80 percent by weight, 40 to 80 percent by weight, 45 to 80 percent by weight, or 50 to 80 percent by weight.

In certain embodiments, the catalytically active fiber composition of any of the above embodiments may further include a binder. The binder may include an organic binder and/or an inorganic binder. The organic binder may include polymer emulsions, solvent-based polymers, solvent-free polymers, starches, organic binder fibers, or mixtures thereof. The polymer emulsions may include latex, natural rubber latex, styrene-butadiene latex, butadiene-acrylonitrile latex, latexes of acrylate/methacrylate polymers/copolymers, or mixtures thereof. The solvent-based polymers may include acrylics, polyurethanes, vinyl acetate, celluloses, rubber-based organic polymers, or mixtures thereof. The solvent-free polymers may include natural rubber, styrene-butadiene rubber, elastomers, or combinations thereof. The starches may include potato starch, corn starch, or mixtures thereof. The organic binder fibers may include polyvinyl alcohol ("PVA") fibers, microfibrillated cellulose fibers, or combinations thereof. Other suitable organic binders include emulsions of polyethylene, polypropylene, polyimides, polyamides, polyvinyl alcohols, polyvinyl acetates, polyvinyl chlorides or any combination thereof.

The inorganic binder may include a colloidal inorganic oxide dispersion including at least one of silica, alumina, ceria, titania, zinc oxide, magnesia, zirconia, or mixtures thereof.

In certain embodiments, the binder may be present in the catalytically active fiber composition in an amount, based on the total weight of the catalytically active fiber composition, of up to 45 percent by weight, e.g., 0.1 to 45 percent by weight, 0.5 to 45 percent by weight, 1 to 45 percent by weight, 2 to 45 percent by weight, 3 to 45 percent by weight, 4 to 45 percent by weight, 5 to 45 percent by weight, 6 to 45 percent by weight, 7 to 45 percent by weight, 8 to 45 percent by weight, 9 to 45 percent by weight, or 10 to 45 percent by weight.

In certain embodiments, the catalytically active fiber composition of any of the above embodiments may further include an intumescent material. The intumescent material may expand upon first use of the composition, in order to provide mechanical support within a product form made from the composition. Intumescent materials may also provide other benefits which may be known in the art. The intumescent material may include mica, unexpanded vermiculite, ion-exchanged vermiculite, heat-treated vermiculite, hydrobiotite, alkaline metal silicates, talc, clay, expandable graphite, or mixtures thereof.

In certain embodiments, the intumescent material may be present in the catalytically active fiber composition in an amount, based on the total weight of the catalytically active fiber composition, of up to 50 percent by weight, e.g., 1 to 50 percent by weight, 2 to 50 percent by weight, 3 to 50 percent by weight, 4 to 50 percent by weight, 5 to 50 percent by weight, 10 to 50 percent by weight, 15 to 50 percent by weight, 20 to 50 percent by weight, 25 to 50 percent by weight, 30 to 50 percent by weight, 35 to 50 percent by weight, 40 to 50 percent by weight, or 45 to 50 percent by weight.

In any embodiment, the catalytically active fiber composition may further include a secondary agent incorporated into the inorganic fibers and/or applied onto at least a portion of the inorganic fibers. For example, the secondary agent could include elements that selectively capture and release gases depending on environmental conditions, e.g., temperature or composition). In some embodiments, the secondary agent includes a gas capture agent. In certain embodiments, the gas-capture agent may include at least one of: a carbon dioxide capturing agent; a nitrogen oxide (NOx) capturing agent; or a sorbent for trace metals (such as lead or cadmium). The carbon dioxide capturing agent may include calcium oxide. The nitrogen oxide (NOx) capturing agent may include at least one barium-containing compound, such as barium oxide, barium hydroxide, barium carbonate, or mixtures thereof. In certain embodiments, the barium-containing compound may be supported on a ceramic material, such as gamma-alumina. The sorbent for trace metals may include an alumino-silicate compound. In this context, what is meant by the term "alumino-silicate compound" is compounds which may range from pure alumina to pure silica. In certain embodiments, the alumino-silicate compound may include silica, kaolin, bauxite, diatomaceous earth, magnesium hydroxide silicates, alumina, or mixtures thereof.

In various embodiments, the releasing temperature may be greater than the light-off temperature of the catalytically active metal. As used herein, the "light-off temperature" is the temperature at which an exhaust gas treatment device is capable of processing a stream of exhaust gas, such that upon exiting the exhaust gas treatment device, the stream of exhaust gas complies with local regulations and/or industry conventions. In any embodiment, the NOx capturing materials may be positioned within an emission control device including the catalytically active fiber composition ahead of the catalytically active metal such that the waste gas would interact with the NOx capturing material prior to interacting with the catalytically active metal. In other embodiments, the NOx capturing material may be located in proximity to the catalytically active metal. In such embodiments, waste gases reach the NOx capturing material and the catalytically active metal at approximately the same time.

Other non-limiting examples of secondary agents include cerium, zirconium, lanthanum, barium, and other metals capable of storing oxygen. When included in an emission control device (e.g., those used in the automotive industry), the oxygen storing material can provide a source of oxygen when converting CO to $CO_2$ during low-oxygen operations (e.g., during fuel rich operations). These oxygen-storing materials readily form oxides in oxygen rich conditions (e.g., lean operation of an engine) that is released when the concentration of oxygen in the air mix drops during low-oxygen operation. In an emission control device including the catalytically active fiber composition, the oxygen storing material may be positioned, e.g., in proximity to the active agent.

In any embodiment, whether incorporated into or applied onto the inorganic fibers, the secondary agent may constitute 0 to 40 percent by weight, based on the total weight of the catalytically active fiber composition. In one or more embodiments, the secondary agent is incorporated into the inorganic fibers and also applied onto a surface of the inorganic fibers. In such embodiments, a total weight of the secondary agent may be, for example, up to 40 percent by weight based on the total weight of the catalytically active fiber composition. In some embodiments, the secondary agent is present in an amount, based on the total weight of the catalytically active fiber composition, of 0.001 to 35 percent by weight, 0.01 to 30 percent by weight, 0.10 to 25 percent by weight, 0.25 to 20 percent by weight, 0.5 to 15 percent by weight, 0.75 to 10 percent by weight, 1 to 5 percent by weight, 1.5 to 4 percent by weight, 1.75 to 3 percent by weight, 1 to 2 percent by weight, 0.5 to 1.5 percent by weight, 0.1 to 1 percent by weight, 0.25 to 0.75 percent by weight, 0.01 to 0.5 percent by weight, or 0.1 to 0.5 percent by weight.

Methods of Preparing Catalytically Active Fiber Compositions

Coating Solutions and Mixtures

Generally, the methods use a coating technique based on solutions containing a dissolved salt of a catalytically active metal (or dissolved salts of catalytically active metals) in either water, an organic solvent, or a mixture of water and an organic solvent. As used herein, "coating" encompasses spraying or dripping the solution or mixture of the metal salts onto the inorganic fiber substrate, and/or soaking or dipping the inorganic fiber substrate into a solution or mixture of the metal salts. In one or more embodiments, the organic solvent may include a volatile organic solvent, such as methanol, ethanol, isopropanol, tetrahydrofuran, acetone, or any combination thereof. In various embodiments, the organic solvent may include a glycol and/or a polyol. Suitable glycols and polyols include, but are not limited to, ethylene glycol, propylene glycol, diethylene glycol, triethylene glycol, or any combination thereof. In an exemplary embodiment, the glycol or polyol includes dipropylene glycol monomethyl ether (commercially available as Dowanol™ DPM glycol ether). In certain embodiments, the polyol or glycol is mixed with water, or mixed with water and another organic solvent in an amount of up to about 50% to about 90%.

In several embodiments, an aqueous salt solution, such as a nitrate, a chloride, a sulfate, or an acetate, of a catalytically active metal is prepared. For example, salt solutions of palladium nitrate, rhodium nitrate, cerium nitrate, palladium chloride, rhodium chloride, or cerium chloride may be used. One of ordinary skill in the art, with the benefit of this disclosure, will recognize that other salts with varying anion species can be used with similar results.

In several embodiments, a coating mixture (e.g., a suspension, a colloid, or a colloidal suspension) of a catalytically active metal is used to coat the inorganic fibers with fine particulates of the metal catalysts. In one or more embodiments, the coating mixture includes a suspension and/or a colloid, where the suspension and/or colloid includes a catalytically active metal as described above. For instance, the coating mixture may include a suspension of organic and/or inorganic binder systems and colloids, such as colloidal silica.

In one or more embodiments, the coating mixture or solution includes an additive. In certain embodiments, the additive includes a gas-capture agent, which may include at least one of a carbon dioxide capturing agent; a nitrogen oxide (NOx) capturing agent; cerium oxide; or a sorbent for trace metals (such as lead or cadmium). The carbon dioxide capturing agent may include calcium oxide. The nitrogen oxide (NOx) capturing agent may include at least one barium-containing compound, such as barium oxide, barium hydroxide, barium carbonate, or mixtures thereof. In certain embodiments, the barium-containing compound may be supported on a ceramic material, such as gamma-alumina. In some embodiments, the additive includes ammonium chloride ($NH_4Cl$). Ammonium chloride promotes ion exchange on the surface of the substrate. For example, $NH_4Cl$ initially binds to the active spots on the inorganic fiber substrate, and the ammonium ion then exchanges with the metal catalyst ion, which helps to anchor the metal catalyst to the surface of the substrate. In some embodiments, $NH_4Cl$ induces an egg shell-like coating where the metal catalyst is embedded into the surface of the fiber. The ammonium ion is liberated as ammonia during heat treatment. In various embodiments, $NH_4Cl$ is added in an amount so that its concentration in the coating mixture or solution is between about 0.05M to about 3.0M In several embodiments, the additive includes citric acid to promote sol/gel formation. In various embodiments, citric acid is added so that its concentration in the coating mixture or solution is between about 0.01M to 3.0M.

The concentrations of the salt of the catalytically active metal (e.g., Ce, Pd, Rh, or combinations thereof) in the solution or mixture can vary but will typically be from about 0.1 wt % to about 20 wt %, based on the weight of the solution or the mixture (e.g., from about 1 wt. % to about 10 wt. % relative to the solution or mixture).

Coating Methods

According to various embodiments, the inorganic fiber substrate is coated by placing the substrate and the coating solution or mixture into a container and applying a vacuum to the container to ensure an even dispersal or coating on the inorganic fiber substrate. Vacuum packing in this manner allows a user to treat the inorganic fiber substrate with fixed amounts of coating solution or mixture to ensure a controlled dosage and allows the user to maintain compression to eliminate handling losses. The overall compression or density of the fiber can be tailored via vacuum pressure to allow a second solution or mixture to be added without causing displacement losses of the first solution or mixture.

In some embodiments, the packaged substrate may be maintained for a predetermined period of time to allow thorough coating of the coating solution or mixture onto the inorganic fiber substrate. For example, the inorganic fiber substrate may remain in contact with the coating solution or mixture for at least 1 hour, at least 6 hours, at least 12 hours, or at least 24 hours prior to heat treatment.

The container is not particularly limited but should be capable of contracting under vacuum such that the coating solution or mixture is forced onto surfaces and into pores of the inorganic fiber substrate. In one or more embodiments, the container is a bag. In one or more embodiments, the container is made of a plastic (e.g., polypropylene) or a polymer. In one or more embodiments, the container includes structures on an interior surface thereof to assist with dispersal of the coating solution or mixture when a vacuum is applied to the container.

In some embodiments, a support structure is provided inside or outside of the container. In one or more embodiments, the support structure includes a metal mesh. In one or more embodiments, the container is configured to aid in the installation of the coated and chemically treated substrate into a drying device, which may be a frame used to support the substrate for application. For instance, in an emission control device including the inorganic fiber substrate, a perforated frame including stainless steel mesh layers can be used to limit fiber losses and as a support structure, with the container containing the coated substrate inserted in the perforated frame before a final heat treatment to remove the container. This configuration limits material handling and the number of stages in the process, reducing overall cost. In some embodiments, the support structure is placed within the container and facilitates even dispersal of the coating solution or mixture through the inorganic fiber substrate when a vacuum is applied to the container.

In one or more embodiments, at least a portion of the container is capable of being degraded by heat. In some embodiments, the entire container may be removed by heating, thereby exposing the inorganic fiber substrate coated with the coating solution or mixture. In embodiments including a support structure, the support structure may be resistant to degradation.

In certain embodiments, the container or a portion thereof may be removed after the coating solution or mixture is drawn onto and/or into the inorganic fiber substrate. The removal of the container may be facilitated by a heat treatment and/or a chemical treatment of the inorganic fiber substrate to degrade the material constituting the container. When a heat treatment is employed, the heat may simultaneously evaporate the solvent or other unwanted components from the coating solution or mixture, thereby leaving only the coated and/or chemically treated fibrous material. In certain embodiments, the heating is configured to simultaneously calcine the coated substrate and to remove undesired components of the coating solution or mixture (e.g., a solvent).

In other embodiments, the container may be removed by simply opening the container and removing the coated inorganic fiber substrate. The coated substrate may then be calcined, which can remove undesired components of the coating solution or mixture (e.g., a solvent).

The container includes at least one opening for introducing the inorganic fiber substrate and the coating solution or mixture. The container may allow dosing of several solution chemistries into the container either at the same time or at controlled times through optional ports or openings. This allows a user to include, for example, pH controls, chelates, and other agents that could limit migration of the dosed coating solutions or mixtures during drying or other processing. In one more embodiments, the solvent for the coating solution or mixture is selected in view of the container material, such that the solvent does not react with the container material. In one or more embodiments, an additive is introduced into the container. The additive may be introduced before or after introducing the coating solution or mixture. In various embodiments, the additive causes a solute or coating compound to precipitate out of the coating solution or mixture and onto the inorganic fiber substrate. In some embodiments, the container includes at least two openings.

According to one or more embodiments, vacuum packing units of fiber together with a solution or mixture containing dissolved metal salts ensures complete and even wetting of the contained fiber. The method, system, and product disclosed herein ensures complete coverage of a fixed dose without waste and presents the product in an easily handled package for downstream processing. Advantages of the present methods include: controlled dosage of fibers using one or more coating liquids; contained fiber dosing; less waste and less cost; easily handled package after dosing; a packaged assembly that can be used to help downstream processes such as presenting the fiber in a form that can be easily installed in cartridge like systems; reduced number of process steps; saving money; safe use of materials; using packaging to minimize human contact; and fast processing.

Metal salt migration can take place only as long as the salt is in solution, so if the metal salt can be precipitated, the metal salt will remain in place on the inorganic fiber substrate as the solvent is removed. According to some embodiments, reducing metal salt migration includes adding a component to the coating solution or mixture, or applying a second coating solution or mixture.

In various embodiments, the viscosity of the coating solution or mixture is modified with a viscosifier, such as latex, a thickener, or a flocculent, and/or with a binder. Suitable viscosifers may include silicates, clays or bentonites. Suitable latexes may include acrylic latex emulsions. A suitable thickener may include a cellulose (e.g., carboxymethyl cellulose and/or hydroxyethyl cellulose). A suitable flocculent may include various salts of EDTA, ammonium hydroxide ($NH_4OH$), or other chelating agents. The added latex, thickener, or flocculent absorbs water from the coating solution or mixture and creates a matrix within the inorganic fiber substrate. The lack of water or solvent in the coating solution or mixture makes it harder for the metal salts to migrate on the inorganic fiber substrate and substantially reduces the mobility of the metal ions. Suitable binders include polyvinyl alcohol, polyvinyl acetate, polyvinyl chloride, polyurethane, acrylic dispersions, polyethylene oxide dispersions, or any combination thereof. The binders may act as dispersants by helping to provide a more dispersed, even coating on the fiber substrate. This may help to mitigate migration upon drying, and the binder burns off during calcination.

In one or more embodiments, a secondary treatment (e.g., a second coating solution or mixture) is used to prevent the migration of the metal salts to the edges of the inorganic fiber substrate. In some embodiments, the secondary treatment involves the use of a suspension and/or a colloid. In several embodiments, the secondary treatment involves the use of a chelating agent like tetraammonium EDTA and various other species of EDTA containing different cation species. For example, an inorganic fiber substrate may first be coated with a solution of a nitrate or a chloride salt of a metal catalyst. Nitrate and chloride salts of metal catalysts are generally very soluble in water or other solvents like methanol or isopropanol. Next, the coated inorganic fiber substrate is coated with a separate EDTA solution. EDTA, unlike nitrate and chloride, forms an insoluble complex with the metal catalyst. These insoluble complexes are deposited on the inorganic fibers and are stationary during the subsequent drying and calcining steps because they are insoluble in the solvent. In various embodiments, the inorganic fiber substrate including the EDTA complexes are dried in an oven (e.g., heated to 600° C., ramping up from 25° C. over an hour). EDTA is an organic compound and ignites and burns off at about 200° C. EDTA therefore degrades and leaves the oxide of the metal (i.e., metal catalyst) on the inorganic fiber substrate.

In other embodiments, the secondary treatment involves modifying the pH of the coated fiber substrate. In certain embodiments, the pH of a coated inorganic fiber substrate may be altered to achieve precipitation of a metal salt or complex. For instance, an inorganic fiber substrate may initially be coated with a metal salt solution having an acidic pH and subsequently be coated with a solution having a basic pH to precipitate a basic salt of the metal. Any common and commercially available bases, such as sodium hydroxide or sodium carbonate may be used to raise the pH of the inorganic fiber substrate from acidic to basic. For example, an inorganic fiber substrate may first be coated with a solution of cerium nitrate or cerium chloride. The coated inorganic fiber substrate may then be coated with a basic solution or treated with a basic solution via steam, which will convert the cerium nitrate or cerium chloride to cerium hydroxide. Hydroxides are typically insoluble or have very low solubility. The insoluble metal hydroxide deposits on the inorganic fiber substrate, and because it is insoluble in the solvent, it remains stationary on the inorganic fiber substrate. Drying and calcination of the metal hydroxide transforms the metal hydroxide to the metal oxide (i.e., metal catalyst) on the inorganic fiber substrate.

In other instances, a compound that decomposes to form a base upon heating, such as urea, may be utilized to elicit the same effect. For example, the coated inorganic fiber substrate is treated with a solution of urea (e.g., by spraying or secondary dipping). Urea degrades in the oven at elevated temperatures to form ammonia ($NH_3$) and carbon dioxide ($CO_2$). The evolved ammonia can basify the coated inorganic fiber substrate to convert the soluble metal salts to the corresponding insoluble metal hydroxides, making them insoluble and preventing their migration.

In several embodiments, the solubility of the metal salts in the coating solution is controlled by, for example, changing the ratio of water to organic solvent or selecting different salt mixes. In one embodiment, a coating solution that is close to the solubility limit of the metal salt is prepared so that the metal salt is quickly deposited during drying. In this embodiment, as soon as the solvent is dried, the metal salt because insoluble almost immediately, exhibits limited mobility and therefore limited migration. In other words, the salt and the solvent for the salt can be selected and their amounts optimized to accelerate precipitation of the salt on the inorganic fiber substrate.

In some embodiments, the order of coating of the inorganic fiber substrate with the metal salts can be important. Determining the correct order could be used with particularly precious or expensive metals such as rhodium that is typically used in smaller quantities and therefore effective use is more valuable. In certain embodiments, one or more of a palladium solution, a rhodium solution, and a cerium solution is prepared. The inorganic fiber substrate can be coated simultaneously or separately with the solutions. In one embodiment, the inorganic fiber substrate is coated with a solution containing cerium and palladium salts first, the coated inorganic fiber substrate is subsequently dried and calcined, the dried coated substrate is then coated with a solution of rhodium, and the rhodium-coated substrate is then dried and calcined. By coating the inorganic fiber substrate with the rhodium last, catalytic activity of the rhodium can be preserved, rather than being blocked by the cerium and palladium. In some embodiments, the order of addition of components is changed. For example, a promoter such as tin or silver can be added to the coating solution or mixture prior to the addition of the active catalyst. In another example, addition of active components like cerium and/or zirconium is followed by the addition of palladium, platinum, and/or rhodium. The order as described above prevents masking or covering of the more expensive precious metals with supporting elements. This ensures that the PGM or active component is outward facing and not masked. Typically, cerium, zirconium, tin, and/or silver is added in excess and provide a supporting or promoting role for the reaction, but is not the physical site of the reaction.

Drying Methods

It can be difficult to fully dry inorganic fiber substrates using conventional methods without observing migration of metal salts to the outside layers and edges of the inorganic fiber substrates. Sample parts wetted with a solution of dissolved metal salts, dried in a conventional oven for 1 hour at 105° C., and calcined at 600° C. for up to 20 minutes showed significant signs of migration of the metal salts towards the top and bottom layers, as well as the outer edges of the inorganic fiber substrate. In some embodiments, the spread (or difference between metal catalyst amounts in the center and the top, bottom, and edges of the inorganic fiber substrate) was greater than 20%, and even up to 80%.

To calculate spread, the following equation is used:

$$\left(\frac{|W_1 - W_2|}{\frac{(W_1 + W_2)}{2}}\right) \times 100$$

where $W_1$ and $W_2$ are the metal catalyst weight percent present in different sections of the inorganic fiber substrate.

In certain embodiments, an inorganic fiber substrate coated according to embodiments of the present disclosure was separated into top, middle, and bottom sections or 1 inch (2.5 cm) of an edge of the coated inorganic fiber substrate was cut off from the center. X-ray fluorescence (XRF) was used to analyze the separated sections of the coated inorganic fiber substrate. Percentages of the catalysts (e.g., $CeO_2$, PdO, $PtO_2$, $ZrO_2$, and $Rh_2O_3$) were measured in each section. In some embodiments, migration or spread between top, middle and bottom sections was less than 10%. Migration or spread between the edges and center in some cases was observed to be up to 35% or up to 25%. Samples that showed significant migration could be identified visually and were assumed to have a greater spread than those that did not.

In several embodiments, after the inorganic fiber substrate is coated with a metal salt, the coated inorganic fiber substrate is dried at ambient air conditions for 1-3 days before completing the drying stage in a conventional oven at 105° C. and calcining at 600° C. for 20 minutes to an hour. This resulted in coated inorganic fiber substrates showing much lower amounts of metal migration (e.g., spread less than 10%). Slower drying prevents rapid evaporation of solvent and results in less metal migration.

In certain embodiments, the coated inorganic fiber substrate is dried using a controlled temperature ramp drying process. For example, the coated inorganic fiber substrate goes through a heating cycle starting at ambient conditions and slowly ramps up (e.g., less than 1° C./minute) the temperature to the final calcination temperature. This dries the coated inorganic fiber substrate at a more controlled rate, which avoids rapid solvent evaporation and migration of metal salts. In another example, the ramp drying process takes place in an oven (or a controlled atmosphere oven) with initial drying starting at ambient temperature and slowly ramping up to 100° C. In an exemplary embodiment, the coated inorganic fiber substrate is dried in a ramp up from 25° C. up to 200° C., where the ramp up in temperature occurs over about 20 minutes to about 240 minutes. The temperature can be held for up to 240 minutes. In some embodiments, the ramp up in temperature can continue up to calcination temperatures with a ramp up time of about 20 minutes to about 240 minutes. Fibers may then be calcined at up to 800° C.

In some embodiments, the water content of the coated inorganic fiber substrate can be modified during the drying stage. For example, a controlled atmosphere oven (e.g., a steam oven) can be used to provide a steam-rich gas to certain portions of the coated inorganic fiber substrate (e.g., the exterior and edges of the inorganic fiber substrate) to prevent metal salts from migrating from the interior surface of the substrate to the exterior surface and edges of the substrate, and offers significant through put opportunity. In an exemplary embodiment, a coated inorganic fiber substrate is dried in a ramp up from 150° C. to 600° C. The ramp up in temperature can take place over about 20 minutes to about 240 minutes with the option to hold at a specific temperature for up to about 240 minutes. The steam feed rate can be up to 2 kg of steam/kg of fiber/hour. In some embodiments, the steam feed rate is about 0.05 to about 10 kg of steam/kg of fiber/hour.

In other embodiments, the pH of the coated inorganic fiber substrate can be modified during the drying stage. For example, a controlled atmosphere oven can be used to dry the coated inorganic fiber substrate in an acidic or basic gas environment to selectively precipitate the metal catalysts out on the inorganic fiber substrate before migration can occur. For example, ammonia gas can be injected into the oven or urea decomposition in the oven can be used.

In various embodiments, microwave radiation is used to dry the coated inorganic fiber substrate. Microwave energy with frequencies between about 1-10 GHz (e.g., 2.4 GHz) and up to 1,000 watts of power (e.g., 700 watts) can be used. Use of microwaves takes roughly 6-10 minutes to dry and dries the inorganic fiber substrate from the inside out so that migration of metal salts from the interior of the substrate to the exterior of the substrate is avoided, and offers significant through put opportunity.

In certain embodiments, the inorganic fiber substrate is placed inside a porous bag (e.g., polypropylene bag) that allows the metal salt solution to coat the inorganic fiber substrate. In an exemplary embodiment, the fiber substrate is in the product form for an emission device or any other catalytic device. The mesh or pore sizes of the bag, and different sizes and weights of the fiber substrate could be optimized, depending on the specific part for a given manufacture. For example, one mesh might be more open, while another one might be more closed. Use of the porous bag would avoid the need for handling any delicate product forms directly, making the product form more handleable. This can be important because any tear in the product form could result in a bypass where exhaust gas is not catalyzed.

In one or more embodiments, the inorganic fiber substrate is coated and dried in the porous bag. The inorganic fiber substrate may or may not be calcined in the bag. For a vehicle emission device, the porous bag could go into the part build and likely be calcined in the final part. For some industrial catalysis applications, the inorganic fiber substrate may be calcined in the porous bag or in the final part.

In some embodiments, freeze drying is used to provide controlled drying to the substrate. Freeze drying provides the ability to slowly or quickly freeze the solution of metal salt within the inorganic fiber substrate and remove the solvent by sublimation, thereby preventing transport of the metal ions.

In various embodiments, infrared radiation (IR) lamp drying is used. Use of IR can dry the substrate, and induce migration of the metal ions to spots where the lamp is shining directly.

Pre-Coating or Pre-Treatment Methods

In certain embodiments, the inorganic fiber substrate is heat-treated and/or treated with a chemical (e.g., a base) before coating with the coating solution or mixture. For example, the inorganic fiber substrate may be treated with a basic solution, such as a 0.05M to 3.0M solution of sodium hydroxide, rinsed, and then dried. In another embodiment, the inorganic fiber substrate is treated with a base, rinsed, dried, treated with a 0.05M to 3.0M solution of ammonium chloride, and then dried. In yet another embodiment, the inorganic fiber substrate is heated to less than about 200° C. for about 30 minutes to about 120 minutes. Pre-coating provides a local change in pH or location of chelate that helps precipitate or secure the metal ion in position and prevent migration. Heat treatment prepares the substrate by cleaning the substrate to provide better adherence of the metal ions.

The following examples are illustrative of the materials and methods discussed above and are not intended to be limiting.

Example 1—Coating of Fiber Sheet with Cerium Nitrate Salt, Palladium Nitrate Salt, and Rhodium Nitrate Salt in Water Using a glass beaker, stir bar and laboratory stir plate, 30.0 g of cerium nitrate hexahydrate ($Ce(NO_3)_3 \cdot 6H_2O$), 3.41 g of palladium nitrate ($Pd(NO_3)_2 \cdot xH_2O$) and 0.34 g of rhodium nitrate ($Rh(NO_3)_3 \cdot xH_2O$) were mixed in 500 mL of water. All the salts were purchased from Sigma-Aldrich. The metal salts were dissolved by placing the mixture in a laboratory sonicator for 5 minutes and stirred at room temperature on the laboratory stir plate at 600 RPM for at least 1 hour. An alumina fiber sheet having an area density of 300 GSM was dipped in the solution and soaked for 5 minutes, flipped, and soaked for an additional 5 minutes. After which the fiber sheet was removed from the solution, and the excess solution was drained off. The resulting coated fiber sheet was dried in an oven between 100° C. and 115° C. The dried, coated fiber sheet was then calcined in a Lindberg/Blue M™ kiln brought to a temperature of 600° C. at a rate of between 9° C. and 10° C. per minute.

The coated fiber sheet was visually inspected to determine the homogeneity of the coating. Ideally, a homogeneous coating can be observed through the sheet. An extreme case of migration would result in much of the catalyst migrating to the outside edges of the sheet (x-axis and y-axis), while the center of the sheet would appear to be uncatalyzed (spread of >50%).

FIG. 1 illustrates a segment of the fiber sheet dried in an oven at 110° C. The sample on the right is the top of the segment where heavy catalyst deposition was observed. The sample on the left is the center of the segment, which experienced heavy migration where the catalyst moved to the outer edges.

Figure 2:
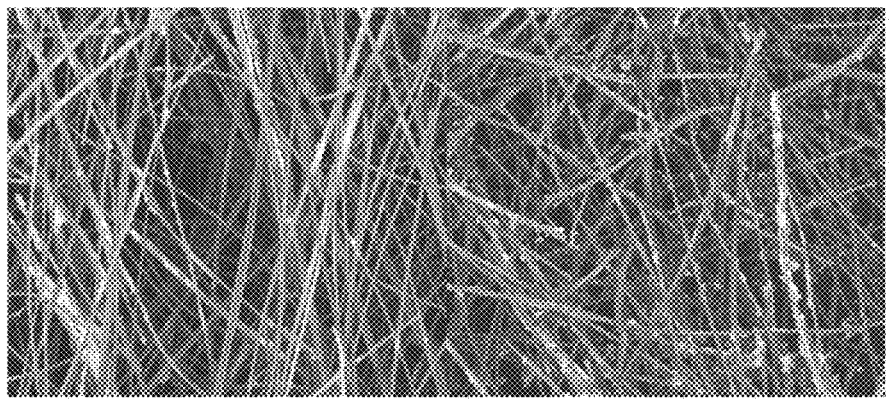
FIG. 2 is a SEM image of the coated fiber sheet of Example 1.

Additionally, scanning electron microscopy (SEM) analysis showed heavy deposits of the catalytic material on the exterior of the fiber sheet, suggesting that the coated sections were not homogeneous. This would result in less efficient catalytic activity as some of the catalytic agent would not be readily available for a reaction to occur. FIG. 2 is an SEM image of the coated fiber sheet magnified at 500×, which was mounted on a carbon stub. The SEM image shows heavy deposits on the fiber sheet rather than an even coating.

Example 2—Coating of Fiber Sheet with Cerium Nitrate Salt, Palladium Nitrate Salt, and Rhodium Nitrate Salt in Water, With Secondary Coating of Tetraammonium EDTA Using a glass beaker, stir bar and laboratory stir plate, 30.0 g of $Ce(NO_3)_3 \cdot 6H_2O$, 3.41 g of $Pd(NO_3)_2 \cdot xH_2O$ and 0.34 g of $Rh(NO_3)_3 \cdot xH_2O$ were mixed in 500 mL of water. All the salts were purchased from Sigma-Aldrich. The metal salts were dissolved by placing the mixture in a laboratory sonicator for 5 minutes and stirred at room temperature on the laboratory stir plate at 600 RPM for at least 1 hour. A separate solution of 5% v/v tetraammonium EDTA was prepared by mixing 60 mL of a 45% diammonium EDTA solution (commercially available from the Dow Chemical Company) with 500 mL of deionized water in a glass beaker, stir bar and laboratory stir plate. The pH of this solution was adjusted to between 9.0 and 10.0 using ammonium hydroxide (commercially available from Alfa Aesar).

An alumina fiber sheet having an area density of 300 GSM was dipped in the metal catalyst solution and soaked for 5 minutes, flipped, and soaked for an additional 5 minutes. After which the fiber sheet was removed from the solution, and the excess solution was drained off. The wet, coated fiber sheet was then placed into the EDTA solution and soaked for 10 seconds, flipped, and soaked for an additional 10 seconds.

The coated fiber sheet was dried in an oven between 100° C. and 115° C. The dried, coated fiber sheet was then calcined in a kiln brought to a temperature of 600° C. at a rate of between 9° C. and 10° C. per minute.

Figure 3:
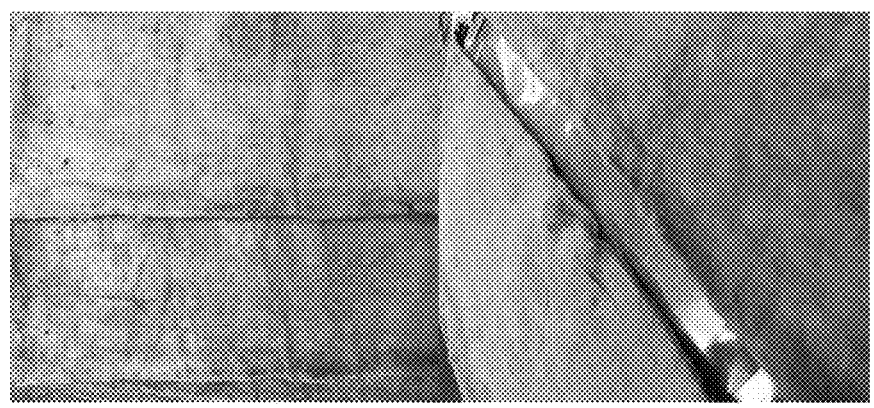
FIG. 3 illustrates segments of the coated fiber sheet of Example 2 according to embodiments of the present disclosure.

Homogenous coating of the sheet was observed upon visual inspection. FIG. 3 is an image of the final coated fiber sheet, showing homogeneity from inside to outside.

Further analysis of the sheet by XRF was used to determine the concentration of cerium, palladium, and rhodium loaded on the sheet. XRF was used to determine the percent weight of each catalytically active oxide on the coated sheet. The results are listed below in Table 2.

TABLE 2

Concentration of Oxides on Catalytically Active Fiber Sheet

| Oxide | Weight % |
|---|---|
| $Al_2O_3$ | 76.7 |
| $SiO_2$ | 1.1 |
| $CeO_2$ | 20.3 |
| PdO | 1.65 |
| $Rh_2O_3$ | 0.11 |
| Residual | 0.14 |

Figure 4A:
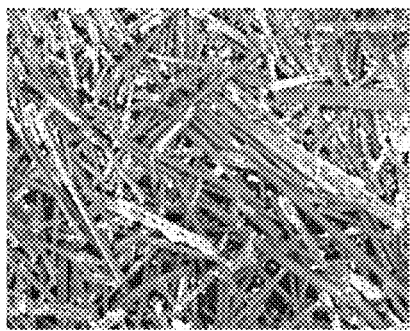
FIG. 4A is an SEM image of the coated fiber sheet of Example 2 according to embodiments of the present disclosure.
Figure 4B:
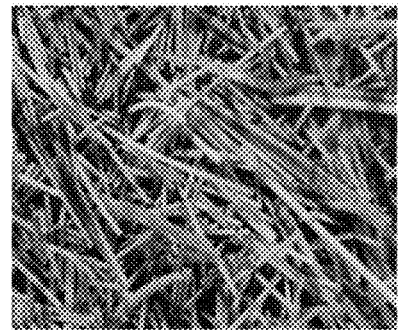
FIG. 4B is an SEM/EDS image of the coated fiber sheet of Example 2 showing an overlay of all detected elements according to embodiments of the present disclosure.
Figure 4C:
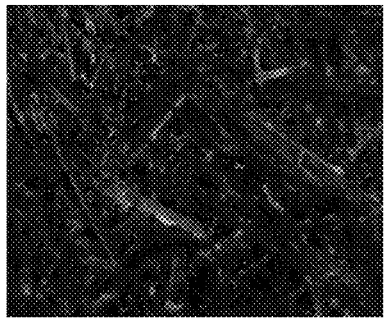
FIG. 4C is an SEM/EDS image of the coated fiber sheet of Example 2 showing palladium only according to embodiments of the present disclosure.
Figure 4D:
FIG. 4D is an SEM/EDS image of the coated fiber sheet of Example 2 showing cerium only according to embodiments of the present disclosure.

The distribution of the catalysts on the surface of the fiber sheet was visualized using SEM/energy dispersive X-ray spectroscopy (EDS) (SEM/EDS) mapping. A single layer of the sample was mounted on a carbon stub and the image was acquired at 500× magnification. FIG. 4A is an SEM image at 500× magnification of the coated fiber sheet mounted on a carbon stub. FIG. 4B is an SEM/EDS image of the coated fiber sheet showing an overlay of all detected elements. FIG. 4C is an SEM/EDS image of the coated fiber sheet where the lighter portions show palladium. FIG. 4D is an SEM/EDS image of the coated fiber sheet where the lighter portions show cerium. Rhodium was not detected due to its minor amount.

Example 3—Coating of Fiber Sheet with Cerium Chloride Salt, Palladium Chloride Salt, and Rhodium Chloride Salt in Methanol and Water, and Air Dried Using a glass beaker, stir bar and laboratory stir plate, 9.6 g of cerium chloride heptahydrate ($CeCl_3 \cdot 7H_2O$), 0.58 g of palladium chloride ($PdCl_2$) and 0.14 g of rhodium chloride ($RhCl_3 \cdot xH_2O$) were mixed in 115 mL of 70% methanol and 335 mL of water. All the salts were purchased from Sigma-Aldrich. The metal salts were dissolved by placing the mixture in a vessel and in a laboratory sonicator for 5 minutes and stirred at room temperature on the laboratory stir plate at 600 RPM for at least 1 hour. The vessel was covered to prevent evaporation of the solvent as the solvent was important to the proper drying of the fiber sheet.

An alumina fiber sheet having an area density of 320 GSM was dipped in the solution and soaked for 5 minutes, flipped, and soaked for an additional 5 minutes. The sample was removed, and any excess solution was removed through the sheet using gentle compression.

The coated fiber sheet was placed on a mesh rack to dry under ambient temperatures. Once the fiber sheet was dry, the coated sheet was placed in a kiln and brought to a temperature of 600° C. at a rate of between 9° C. and 10° C. per minute.

The homogeneity of the sheet was determined visually and by XRF. In this embodiment, a portion of the sheet was separated into three even sections: top, middle and bottom. The "top" section of the sample was considered to be the face of the sheet initially facing up during the soaking of the sheet. XRF was used to determine the percent weight of each catalytically active oxide coated on each of the sections. In this embodiment, the largest percent difference between segments observed was about 13% with cerium oxide ($CeO_2$) between the top and bottom layers, but migration between top and middle layers and between middle and bottom layers was less than 11% for $CeO_2$, palladium oxide (PdO), and rhodium oxide ($Rh_2O_3$). This suggests that migration was severely limited by harnessing the solubility limitations of the catalytic salts in a water/alcohol mix when dried in ambient conditions.

TABLE 3

Concentration of Oxides on Segments of the Catalytically Active Fiber Sheet

| | % Weight per Section | | |
| --- | --- | --- | --- |
| Oxide | Top | Middle | Bottom |
| $Al_2O_3$ | 84.4 | 85.7 | 85.8 |
| $SiO_2$ | 1.4 | 1.4 | 1.4 |
| $CeO_2$ | 12.4 | 11.2 | 10.9 |
| PdO | 1.4 | 1.4 | 1.4 |
| $Rh_2O_3$ | 0.29 | 0.28 | 0.31 |
| Residual | 0.11 | <0.1 | 0.1 |

The distribution of the catalytically active oxides on the surface of the fiber sheet was visualized using SEM/EDS mapping. A single layer of the sample was mounted on a carbon stub, and the image was acquired at 500× magnification. SEM/EDS mapping shows heterogeneous coating of the inorganic fibers on localized sections. This highlights the importance of removing excess solvent and even drying of the coated fiber sheet to achieve a homogenous coating on the fiber sheet and on individual fibers.

Figure 5:
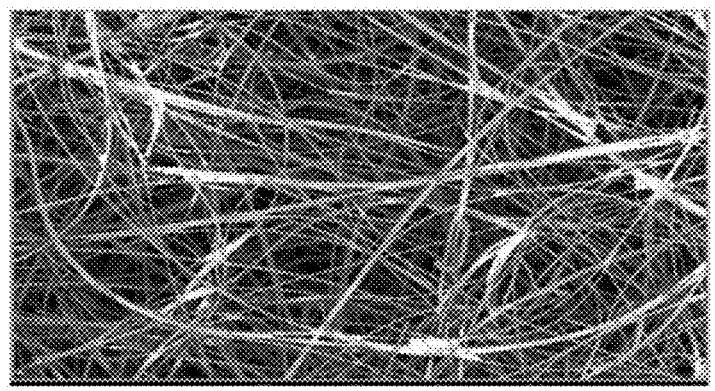
FIG. 5 is an SEM image of the coated fiber sheet of Example 3 according to embodiments of the present disclosure.
Figure 6A:
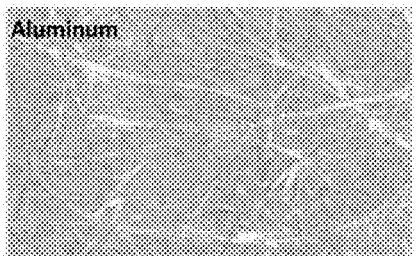
FIG. 6A is an SEM/EDS image of the coated fiber sheet of Example 3 showing aluminum according to embodiments of the present disclosure.
Figure 6B:
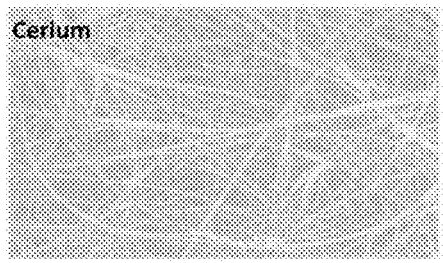
FIG. 6B is an SEM/EDS image of the coated fiber sheet of Example 3 showing cerium only according to embodiments of the present disclosure.
Figure 6C:
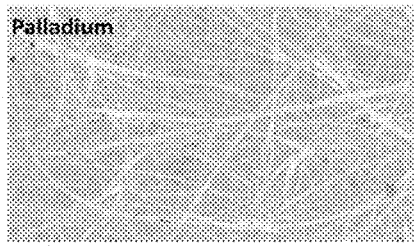
FIG. 6C is an SEM/EDS image of the coated fiber sheet of Example 3 showing palladium only according to embodiments of the present disclosure.
Figure 6D:
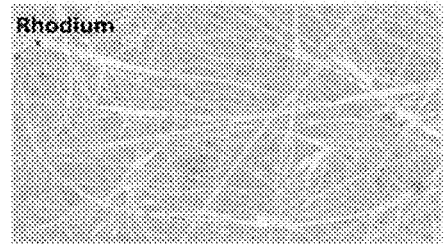
FIG. 6D is an SEM/ED S image of the coated fiber sheet of Example 3 showing rhodium only according to embodiments of the present disclosure.

FIG. 5 is an SEM image at 500× magnification of the coated fiber sheet. FIG. 6A is an SEM/EDS image of the coated fiber where the darker portions show aluminum. FIG. 6B is an SEM/EDS image of the coated fiber sheet where the lighter portions show cerium. FIG. 6C is an SEM/EDS image of the coated fiber sheet where the lighter portions show palladium. FIG. 6D is an SEM/EDS image of the coated fiber sheet where the lighter portions show rhodium.

Example 4—Coating of Fiber Sheet with Cerium Chloride Salt, Palladium Chloride Salt, and Rhodium Chloride Salt in Methanol and Water, and Air Dried Using a glass beaker, stir bar and laboratory stir plate, 5.8 g of $CeCl_3 \cdot 7H_2O$, 0.30 g of $PdCl_2$ and 0.10 of $RhCl_3 \cdot xH_2O$ were mixed in 80 ml of 70% methanol and 245 mL of water. All the salts were purchased from Sigma-Aldrich. The metal salts were dissolved by placing the mixture in a vessel and in a laboratory sonicator for 5 minutes and stirred at room temperature on the laboratory stir plate at 600 RPM for at least 1 hour. The vessel was covered to prevent evaporation of the solvent, as the solvent was important to the proper drying of the sheet.

An alumina fiber sheet having an area density of 320 GSM was dipped in the solution and soaked for 5 minutes, flipped, and soaked for an additional 5 minutes. The sample was removed and any excess solution from the sheet was allowed to drain.

The now coated sheet was placed on a mesh rack to dry under ambient temperatures. Once the fiber sheet was dry, the coated sheet was place in a kiln and brought to a temperature of 600° C. at a rate of between 9° C. and 10° C. per minute.

The homogeneity of the sheet was determined visually and by XRF. In this embodiment, a 2 cm perimeter of the sheet was cut off. This sample was designated as "edges" and the remainder of the sheet was designated as the "center." XRF was used to determine the percent weight of each catalyst coated on each of the sections. In this embodiment, some migration along the x-axis was observed with the cerium catalyst having an observed spread of about 40%, the palladium catalyst having a spread of about 18%, and the rhodium catalyst having a spread of about 8%.

Figure 7:
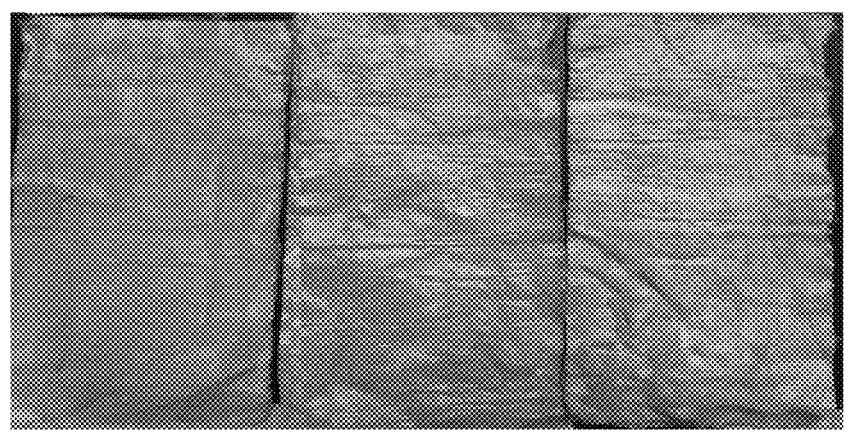
FIG. 7 illustrates segments (top, middle, and bottom) of the coated fiber sheet of Example 4 according to embodiments of the present disclosure.

FIG. 7 shows an image of the top (left), middle (center), and bottom (right) of the sheet, showing visually a homogeneous coating.

The distribution of the catalytically active oxides on the surface of the fiber sheet was visualized using SEM/EDS mapping. A single layer of the sample was mounted on a carbon stub, and the image was acquired at 500× magnification. SEM/EDS mapping illustrated a homogeneous and even coating on the fiber sheet with three catalytically active oxides: $CeO_2$, PdO and $Rh_2O_3$. This further describes the importance of the solvent mixture and salt selection to achieve a homogenous coating.

Figure 8:
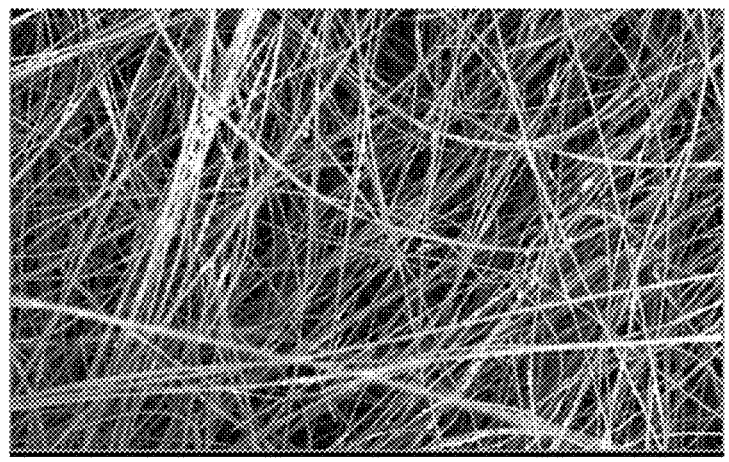
FIG. 8 is an SEM image of the coated fiber sheet of Example 4 according to embodiments of the present disclosure.
Figure 9A:
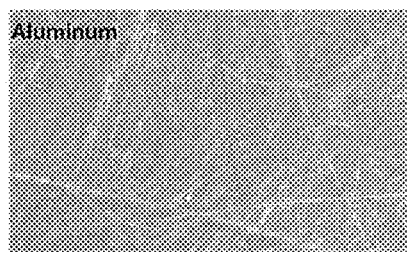
FIG. 9A is an SEM/EDS image of the coated fiber sheet of Example 4 showing aluminum according to embodiments of the present disclosure.
Figure 9B:
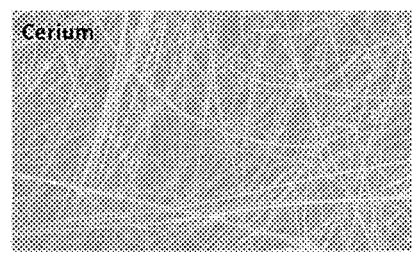
FIG. 9B is an SEM/EDS image of the coated fiber sheet of Example 4 showing cerium only according to embodiments of the present disclosure.
Figure 9C:
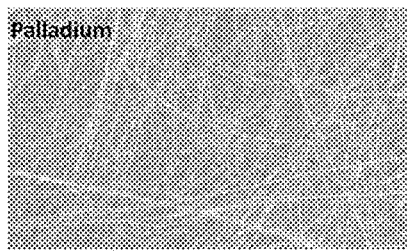
FIG. 9C is an SEM/EDS image of the coated fiber sheet of Example 4 showing palladium only according to embodiments of the present disclosure.
Figure 9D:
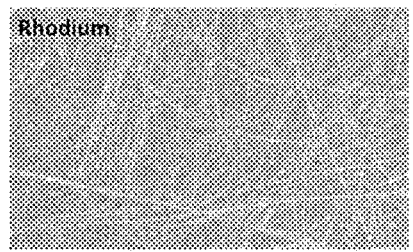
FIG. 9D is an SEM/ED S image of the coated fiber sheet of Example 4 showing rhodium only according to embodiments of the present disclosure.

FIG. 8 is an SEM image at 500× magnification of the coated fiber sheet. FIG. 9A is an SEM/EDS image of the coated fiber where the darker portions show aluminum. FIG. 9B is an SEM/EDS image of the coated fiber sheet where the lighter portions show cerium. FIG. 9C is an SEM/EDS image of the coated fiber sheet where the lighter portions show palladium. FIG. 9D is an SEM/EDS image of the coated fiber sheet where the lighter portions show rhodium.

TABLE 4

Concentration of Oxides on Segments of the Catalytically Active Fiber Sheet

| | % Weight per Section | |
| --- | --- | --- |
| Oxide | Center | Edges |
| $Al_2O_3$ | 84.4 | 80.2 |
| $SiO_2$ | 3.0 | 2.8 |
| $CeO_2$ | 9.4 | 14.2 |
| PdO | 1.0 | 1.2 |
| $Rh_2O_3$ | 0.23 | 0.25 |
| Residual | 2.0 | <0.1 |

Example 5—Coating of Fiber Sheet with Cerium Nitrate Salt in Water and Dried in a Microwave Using a glass beaker, stir bar and laboratory stir plate, 8.4 g of $Ce(NO_3)_3 \cdot 6H_2O$ in 225 mL of water was mixed and stirred at room temperature on the laboratory stir plate at 400 RPM for at least 15 minutes. An alumina fiber sheet having an area density of 1000 GSM was dipped in the solution and soaked for 5 minutes, flipped, and soaked for an additional 5 minutes. The sample was removed, and any excess solution from the sheet was allowed to drain. The resulting coated sheet was separated into four different sections having an area density of about 260 GSM. Each section was dried in a microwave (700W; 2.4 GHz) for 6 minutes. Once the fiber sheet was dry, the coated mat was placed in a kiln at 550° C. for 15 minutes.

XRF was used to determine the percent weight of the cerium catalyst and to determine the extent of the migration upon drying, if any, between the top, the middle and bottom sections of the sheet. The "top" section of the sample was considered to be the face of the sheet initially facing up during the soaking of the sheet. As shown below, the greatest spread between the middle section and the outside sections was about 13%. In this embodiment, a method to homogeneously coat alumina fiber with a catalytically active material, efficiently dry and calcine the material without sufficiently causing migration of the catalyst to the outside edges of the mat was demonstrated.

TABLE 5

Concentration of Oxides on Segments of-12.8 the Catalytically Active Fiber Sheet

| | % Weight per Section | | |
| --- | --- | --- | --- |
| Oxide | Top | Middle | Bottom |
| $Al_2O_3$ | 83.8 | 83.5 | 84.3 |
| $SiO_2$ | 3.0 | 2.8 | 3.5 |
| $CeO_2$ | 12.8 | 13.2 | 11.6 |

Example 6—Coating of Fiber Sheet with Chloroplatinic Acid and Palladium Chloride Salt in Ethylene Glycol and Water, and Dried at 100° C.

Using a glass beaker, stir bar and laboratory stir plate, 0.18 g of palladium chloride ($PdCl_2$) and 0.61 g of chloroplatinic acid hydrate ($H_2PtCl_6 \cdot xH_2O$) were mixed in 35 mL of ethylene glycol and 385 mL of water. All the salts were purchased from Sigma-Aldrich. The metal salts were dissolved by placing the mixture in a vessel and stirred at room temperature on the laboratory stir plate at 600 RPM for at least 1 hour. The vessel was covered to prevent evaporation of the solvent, as the solvent was important to the proper drying of the sheet.

An alumina fiber sheet having an area density of 320 GSM was dipped in the solution and soaked for 60 minutes. The sample was removed and any excess solution from the sheet was allowed to drain.

The coated sheet was placed on a rack to dry at a temperature of 100° C. Once the fiber sheet was dry, the coated sheet was placed in a furnace and brought to a temperature of 600° C. at a rate of between 1° C. and 20° C. per minute. In this embodiment, a rate of 5° C. per minute was used.

The homogeneity of the sheet was determined visually and by XRF. In this embodiment, a 2 cm perimeter of the sheet was cut off. A representative sample of the coated fiber was taken from the center of the mat. XRF was used to determine the percent weight of each component coated on the mat. In this embodiment, not all of the PGMs charged in the coating process adhered to the fiber and were drained off after the coating process. However, migration of the PGM was limited, with the platinum catalyst having an observed spread of <5% and the palladium catalyst having an observed spread of <15%.

Figure 10:
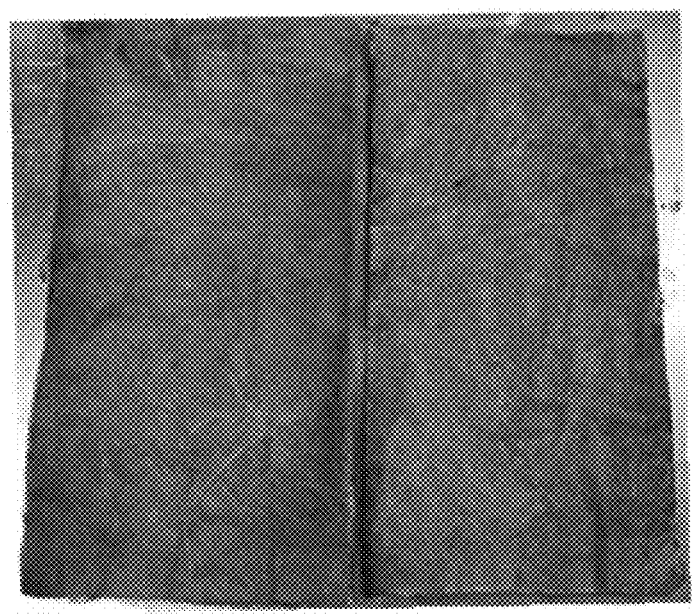
FIG. 10 illustrates segments (outside and middle) of the coated fiber sheet of Example 6 according to embodiments of the present disclosure.

FIG. 10 shows an image of the outside (left) and middle (right) of the coated fiber mat, showing visually a homogeneous coating.

TABLE 6

Concentration of Oxides on Segments of the Catalytically Active Fiber Sheet

| Oxide | % Weight |
| --- | --- |
| $Al_2O_3$ | 92.8 |
| $SiO_2$ | 2.0 |
| $PtO_2$ | 1.8 |
| PdO | 0.78 |
| Residual | 2.6 |

Example 7—Coating of Fiber Sheet with Chloroplatinic Acid and Palladium Chloride Salt in Propylene Glycol and Water, and Steam Oven Dried Using a glass beaker, stir bar and laboratory stir plate, 0.625 g of chloroplatinic acid hydrate ($H_2PtCl_6 \cdot xH_2O$) and 0.11 g of palladium chloride ($PdCl_2$) were mixed in 340 mL of water and 80 mL of propylene glycol. All the salts were purchased from Sigma-Aldrich. The metal salts were dissolved by placing the mixture in a vessel and in a laboratory sonicator for 5 minutes and stirred at room temperature on the laboratory stir plate at 600 RPM for at least 1 hour. The vessel was covered to prevent evaporation of the solvent, as the solvent was important to the proper drying of the fiber sheet.

An alumina fiber sheet having an area density of 320 GSM was dipped in the solution and soaked for 60 minutes. The sample was removed and any excess solution from the sheet was allowed to drain.

The coated fiber sheet was placed on a rack and placed into a steam oven. The wet sample was brought to a temperature of 600° C. at a rate between 1° C. and 20° C. per minute. In this embodiment, a rate of 10° C. per minute was used and held at temperature for one hour. The sample was dried under steam fed conditions in an oven at a rate between of 2.0 kg steam/kg of fiber/hr. In general, a rate of between 0.5 and 10 kg steam/kg of fiber/hr may be used.

The homogeneity of the sheet was determined visually and by XRF. In this embodiment, a 2 cm perimeter of the sheet was cut off. A representative sample of the coated fiber was taken from the center of the mat. XRF was used to determine the percent weight of each component coated on the mat. In this embodiment, not all of the PGMs charged in the coating process adhered to the fiber and was drained off after the coating process. However, migration of the PGM was limited, with the platinum catalyst having an observed spread of <5% and the palladium catalyst having an observed spread of <15%.

Figure 11:
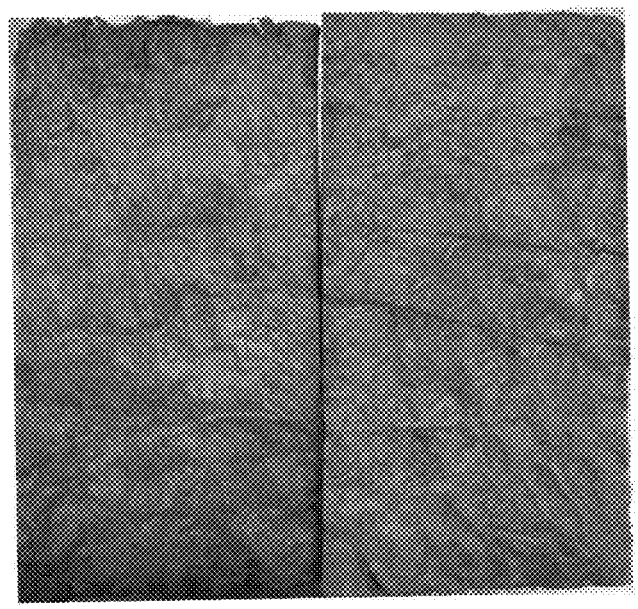
FIG. 11 illustrates segments (outside and middle) of the coated fiber sheet of Example 7 according to embodiments of the present disclosure.

FIG. 11 shows an image of the outside (left) and middle (right) of the coated fiber mat, showing visually a homogeneous coating.

TABLE 7

Concentration of Oxides on Segments of the Catalytically Active Fiber Sheet

| Oxide | % Weight |
|---|---|
| $Al_2O_3$ | 93.8 |
| $SiO_2$ | 2.0 |
| $PtO_2$ | 1.7 |
| PdO | 0.47 |
| Residual | 2.0 |

Example 8—Preparation and Coating of Fiber Sheet with a Synthesized Ceria-Zirconia Solid Solution Via Sol-Gel Method Using a glass beaker, stir bar and laboratory stir/hot plate, 4 g of zirconyl chloride octahydrate ($ZrOCl_2 \cdot 8H_2O$), 5.2 g of cerium nitrate hexahydrate ($Ce(NO_3)_3 \cdot 6H_2O$) and 1 g of citric acid ($C_6H_8O_7$) were mixed in 250 mL distilled water. All the salts were purchased from Sigma-Aldrich. The metal salts and citric acid were dissolved by placing the mixture in a vessel and stirred at room temperature on the laboratory stir plate at 600 RPM for at least 1 hour. The vessel was covered to prevent evaporation of the solvent. When the salts were dissolved the pH was adjusted to 6 by adding ammonium hydroxide ($NH_4OH$) drop-wise while monitoring using a pH probe. The solution was then heated to 70° C. while stirring at 650 RPM for at least 1 hour.

An alumina fiber sheet having an area density of 170 GSM was saturated with 17 mL of the prepared ceria-zirconia sol-gel solution.

The coated fiber sheet was placed on a rack to dry at a temperature of 100° C. (but could also be dried at room temperature). Once the fiber sheet was dry, the coated sheet was placed in a furnace and brought to a temperature of 350° C. at a rate of between 1° C. and 20° C. per minute and held at 350° C. for 1 hour. In this embodiment, a rate of 5° C. per minute was used.

The chemical composition and homogeneity of the sheet was determined visually, by SEM, and by XRF. In this embodiment, a 2 cm perimeter of the sheet was cut off. A representative sample of the coated fiber was taken from the center of the mat. XRF was used to determine the weight percent of each component coated on the mat. Migration of the ceria-zirconia coating was limited, with the ceria having an observed spread of <15% and the zirconia having an observed spread of <15%.

Figure 12:
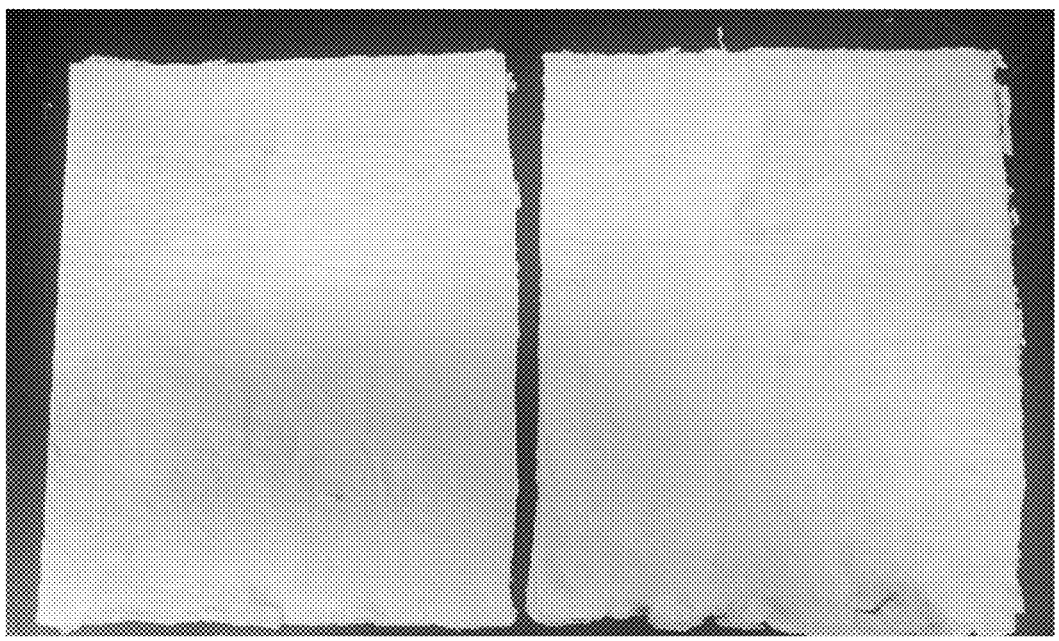
FIG. 12 illustrates segments (outside and middle) of the coated fiber sheet of Example 8 according to embodiments of the present disclosure.

FIG. 12 shows an image of the outside (left) and middle (right) of the coated fiber mat, showing visually a homogeneous coating.

Figure 13:
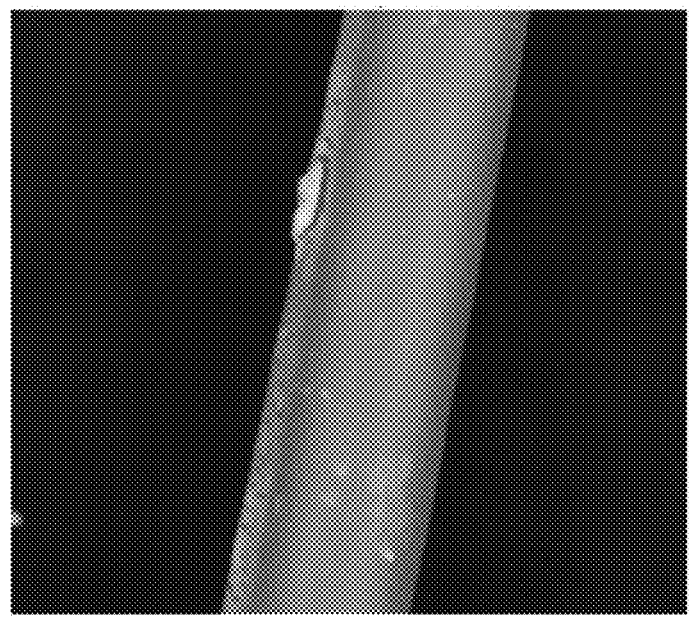
FIG. 13 is an SEM image of the coated fiber sheet of Example 8 according to embodiments of the present disclosure.
Figure 14:
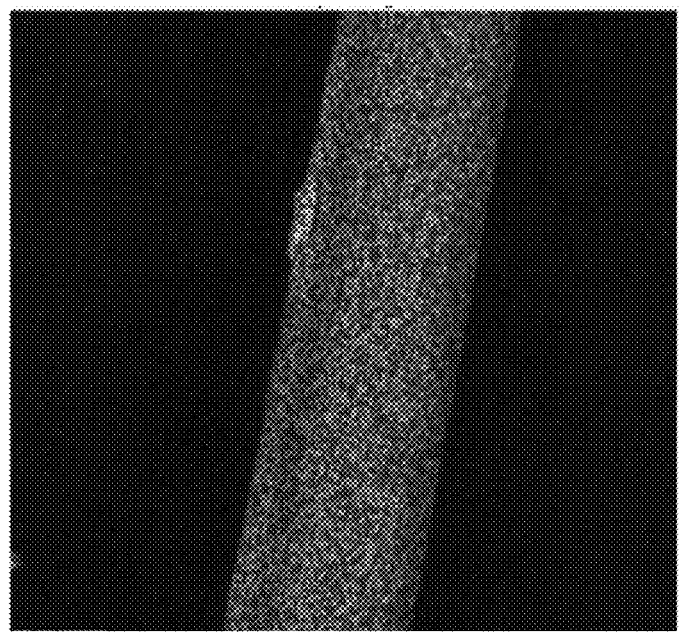
FIG. 14 is an EDS map of the coated fiber sheet of Example 8 according to embodiments of the present disclosure.

FIG. 13 shows an SEM image of the coated fiber sheet, and FIG. 14 shows an EDS map of the fiber coated with ceria-zirconia, where zirconia is shown as the darker gray and ceria is shown as the lighter gray.

TABLE 8

Concentration of Oxides on Segments of the Fiber Sheet Coated with Ceria-Zirconia

| Oxide | % Weight |
|---|---|
| $Al_2O_3$ | 65.0 |
| $SiO_2$ | 2.4 |
| $CeO_2$ | 11.0 |
| $ZrO_2$ | 12.6 |
| Residual | 9.0 |

Although only a few exemplary embodiments have been described in detail above, those of ordinary skill in the art will readily appreciate that many other modifications are possible in the exemplary embodiments without materially departing from the novel teachings and advantages of the present disclosure. Accordingly, all such modifications are intended to be included within the scope of the present disclosure as defined in the following claims.

The invention claimed is:

1. A method for preparing a catalytically active fiber composition comprising:
   preparing a first coating solution or mixture comprising:
      a salt or a colloid of a catalytically active metal, and
      water, an organic solvent, or a combination thereof,
   coating an inorganic fiber substrate with the first coating solution or mixture;
   reducing migration of the catalytically active metal on the inorganic fiber substrate by:
      adding a viscosifier to the first coating solution or mixture before coating the inorganic fiber substrate, wherein the viscosifier comprises a latex or a flocculent,
      applying a second coating solution or mixture to the coated inorganic fiber substrate, or
      pre-treating the inorganic fiber substrate before coating the inorganic fiber substrate;
   drying the coated inorganic fiber substrate; and
   calcining the dried, coated inorganic fiber substrate.

2. The method of claim 1, wherein reducing migration of the catalytically active metal comprises applying a second coating solution to the coated inorganic fiber substrate, and the second coating solution comprises a chelating agent.

3. The method of claim 2, wherein the chelating agent comprises a salt of ethylenediaminetetraacetic acid (EDTA).

4. The method of claim 1, wherein reducing migration of the catalytically active metal comprises applying a second coating solution to the coated inorganic fiber substrate, and the second coating solution comprises a compound that decomposes to form a base upon heating.

5. The method of claim 4, wherein the compound that decomposes to form a base comprises urea.

6. The method of claim 1, wherein:
reducing migration of the catalytically active metal comprises applying a second coating solution or mixture to the coated inorganic fiber substrate,
the first coating solution or mixture has an acidic pH, and
the second coating solution or mixture has a basic pH.

7. The method of claim 1, wherein
reducing migration of the catalytically active metal comprises applying a second coating solution or mixture to the coated inorganic fiber substrate,
the first coating solution or mixture comprises a salt of cerium and a salt of palladium, and
the second coating solution or mixture comprises a salt of rhodium.

8. The method of claim 1, further comprising disposing the inorganic fiber substrate in a porous bag during the coating, the drying, and/or the calcining.

9. The method of claim 1, wherein reducing migration of the catalytically active metal comprises pre-treating the inorganic fiber substrate before coating the inorganic fiber substrate, and the inorganic fiber substrate is heat-treated or treated with a base prior to coating.

10. A method for preparing a catalytically active fiber composition comprising:
preparing a coating solution or mixture comprising:
a salt or a colloid of a catalytically active metal, and
water, an organic solvent, or a combination thereof;
coating an inorganic fiber substrate with the coating solution or mixture;
drying the coated inorganic fiber substrate at ambient conditions, by freeze drying, under controlled conditions, with infrared radiation, or with microwave radiation to reduce migration of the catalytically active metal on the inorganic fiber substrate; and
calcining the dried, coated inorganic fiber substrate.

11. The method of claim 10, wherein the inorganic fiber substrate is dried under controlled conditions, and a temperature of drying is controlled by ramping up the temperature from ambient temperature to a higher than ambient temperature in an oven.

12. The method of claim 10, wherein the inorganic fiber substrate is dried under controlled conditions, and an atmosphere of drying is controlled by using a controlled atmosphere oven.

13. The method of claim 12, wherein the controlled atmosphere oven provides an acidic, basic, or steam-rich gas during drying.

14. The method of claim 10, wherein the inorganic fiber substrate is dried with microwave radiation at frequencies of between 1-10 GHz.

15. The method of claim 10, further comprising disposing the inorganic fiber substrate in a porous bag during the coating, the drying, and/or the calcining.

16. A method for preparing a catalytically active fiber composition comprising:
preparing a coating solution comprising:
a salt of a catalytically active metal,
water, and
an organic solvent,
controlling solubility of the salt in the coating solution by adjusting an amount of the salt, the water, or the organic solvent in the coating solution;
coating an inorganic fiber substrate with the coating solution;
drying the coated inorganic fiber substrate in a steam oven; and
calcining the dried, coated inorganic fiber substrate.

17. The method of claim 16, wherein the organic solvent comprises methanol, ethanol, isopropanol, tetrahydrofuran, acetone, or a combination thereof.

18. The method of claim 16, wherein the organic solvent comprises a glycol, a polyol, or a combination thereof.

19. The method of claim 16, wherein the salt comprises a nitrate, chloride, sulfate, or acetate salt.

20. The method of claim 16, further comprising disposing the inorganic fiber substrate in a porous bag during the coating, the drying, and/or the calcining.

21. A method for preparing a catalytically active fiber composition comprising:
preparing a first coating solution or mixture comprising:
a salt or a colloid of a catalytically active metal, and
water, an organic solvent, or a combination thereof;
placing an inorganic fiber substrate into a container;
coating the inorganic fiber substrate with the first coating solution or mixture by applying a vacuum to the container;
drying the coated inorganic fiber substrate; and
calcining the dried, coated inorganic fiber substrate.

22. The method of claim 21, further comprising removing the container by heating.

* * * * *

UNITED STATES PATENT AND TRADEMARK OFFICE
CERTIFICATE OF CORRECTION

PATENT NO. : 11,766,662 B2
APPLICATION NO. : 17/480603
DATED : September 26, 2023
INVENTOR(S) : Kevin E. Siters et al.

It is certified that error appears in the above-identified patent and that said Letters Patent is hereby corrected as shown below:

In the Specification

Column 3, Line 44, change "SEM/ED S" to --SEM/EDS--.
Column 3, Line 62, change "SEM/ED S" to --SEM/EDS--.

Signed and Sealed this
Seventh Day of November, 2023

Katherine Kelly Vidal
*Director of the United States Patent and Trademark Office*